US012684498B2

(12) United States Patent
Nadakuduti et al.

(10) Patent No.: US 12,684,498 B2
(45) Date of Patent: Jul. 14, 2026

(54) RADIO FREQUENCY EXPOSURE COMPLIANCE FOR TRANSITIONS BETWEEN EXPOSURE CONTROL SCHEMES

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 18/079,859

(22) Filed: Dec. 12, 2022

(65) Prior Publication Data

US 2023/0189168 A1 Jun. 15, 2023

Related U.S. Application Data

(60) Provisional application No. 63/364,314, filed on May 6, 2022, provisional application No. 63/289,072, filed on Dec. 13, 2021.

(51) Int. Cl.
*H04W 52/36* (2009.01)
*H04W 52/22* (2009.01)
(52) U.S. Cl.
CPC ....... *H04W 52/367* (2013.01); *H04W 52/225* (2013.01)
(58) Field of Classification Search
CPC .......................... H04W 52/367; H04W 52/225
See application file for complete search history.

(56) References Cited

U.S. PATENT DOCUMENTS 10,652,833 B2    5/2020   Nadakuduti et al.
2014/0274190 A1   9/2014   Lu et al.
2020/0015171 A1*  1/2020   Nadakuduti ......... H04B 1/3838

FOREIGN PATENT DOCUMENTS

EP         2950597 B1    10/2018

OTHER PUBLICATIONS

International Search Report and Written Opinion—PCT/US2022/081416—ISA/EPO—Apr. 20, 2023.

* cited by examiner

*Primary Examiner* — Elton Williams
(74) *Attorney, Agent, or Firm* — Patterson & Sheridan LLP / Qualcomm

(57) ABSTRACT

Certain aspects of the present disclosure provide techniques and apparatus for operating a wireless communication device pursuant to radio frequency (RF) exposure compliance. An example method of wireless communication includes obtaining RF exposure information associated with a first RF exposure control scheme, wherein the first RF exposure control scheme is associated with one or more first radios. The method further includes transmitting a signal via one or more second radios associated with a second RF exposure control scheme at a transmit power based at least in part on the RF exposure information, wherein the one or more first radios are different than the one or more second radios.

23 Claims, 11 Drawing Sheets

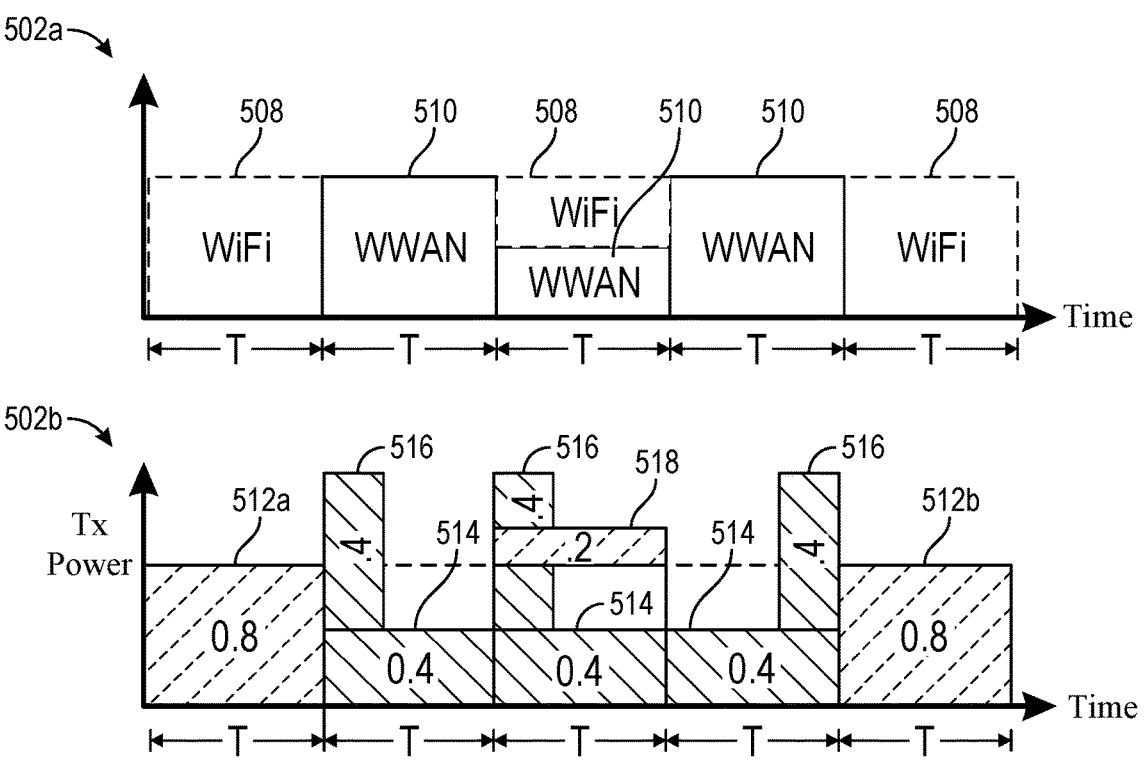
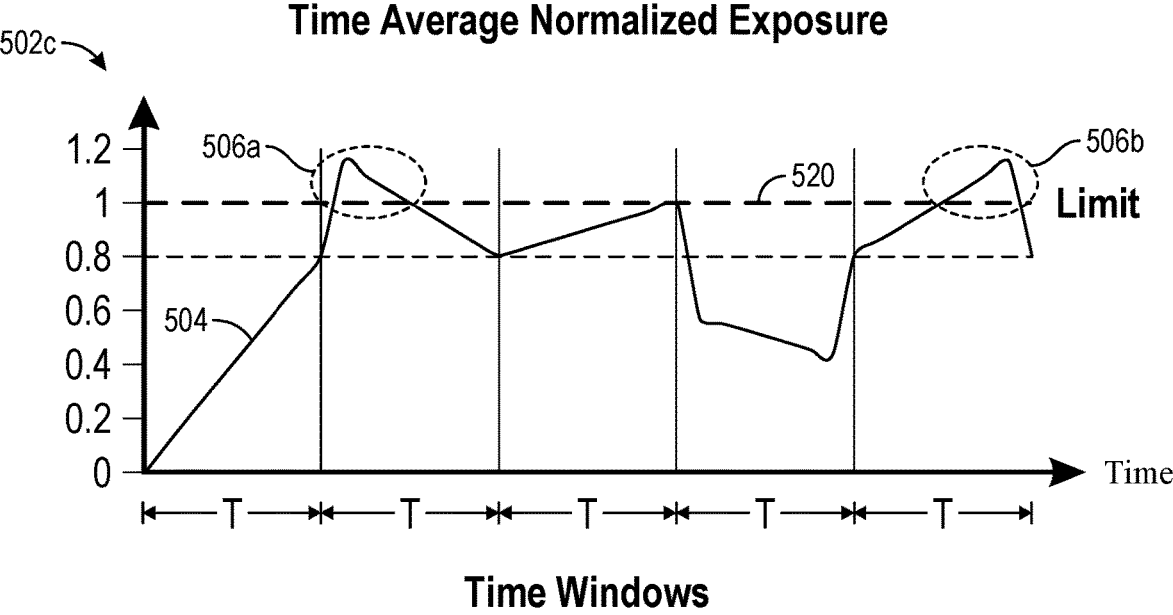
Time Average Normalized Exposure
Time Windows
FIG. 5

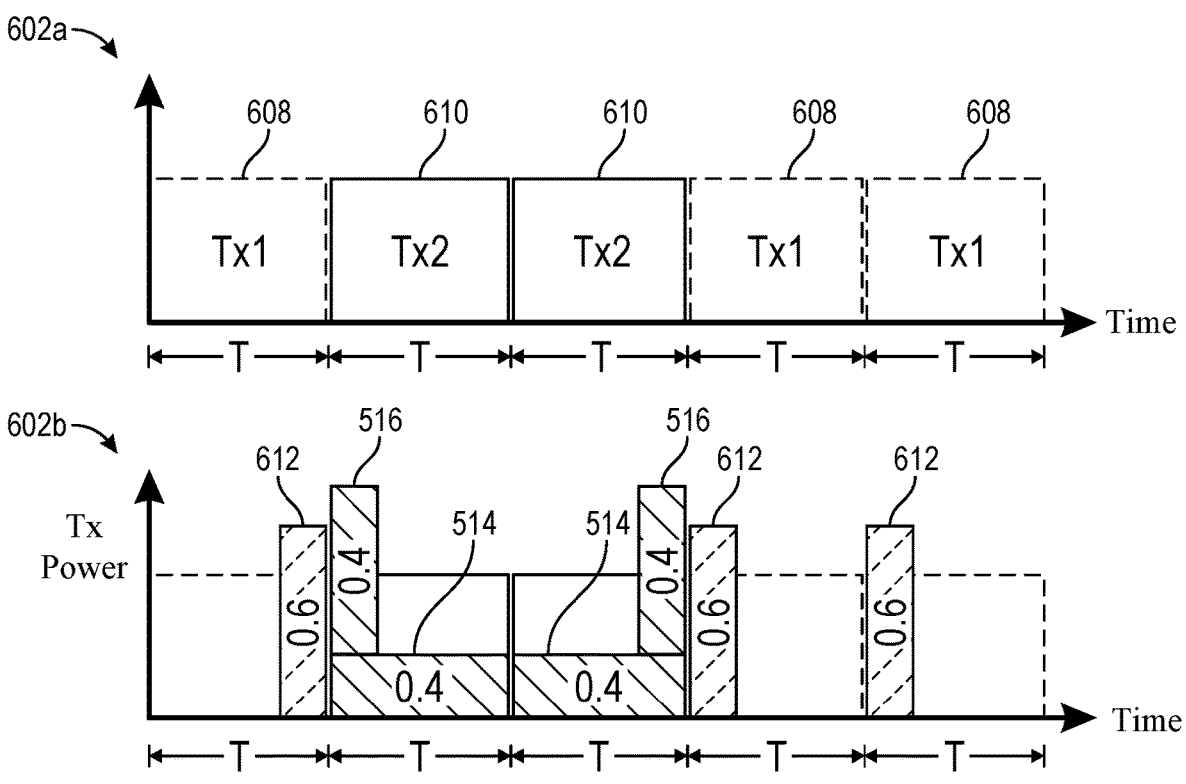
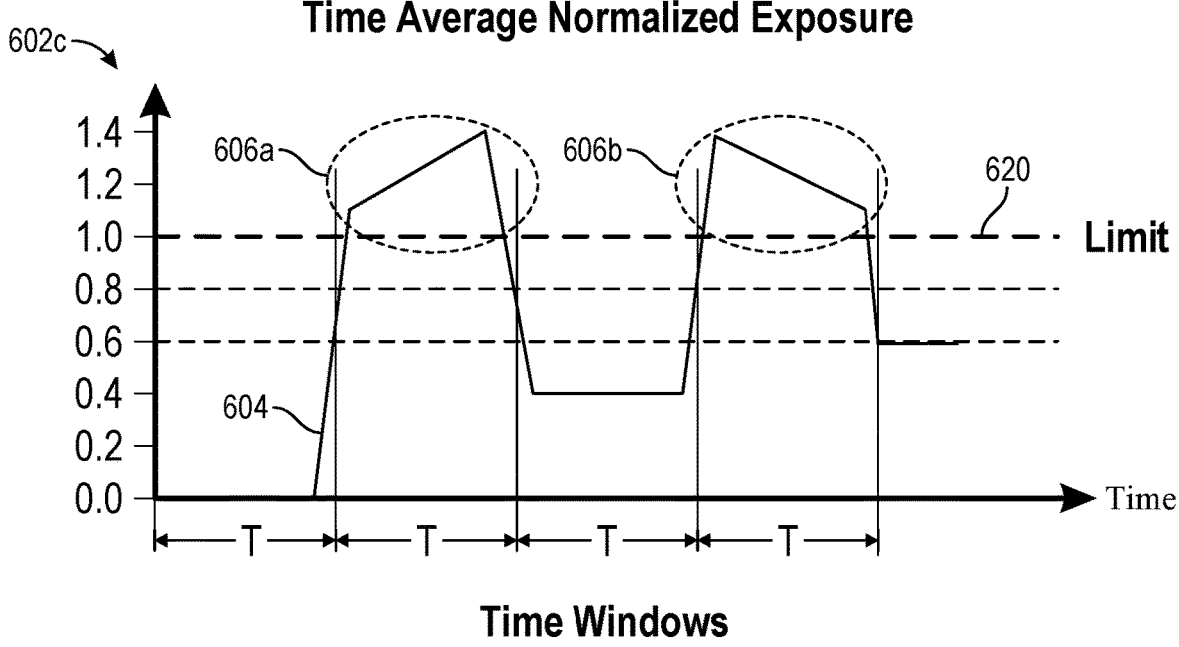
Time Average Normalized Exposure
Time Windows
FIG. 6

800

804

Base Inputs:

1. $P_{limit}$ Per Tech/Band/DSI/Ant

2. Reduced $P_{limit}$ for Simult-Tx (RFECS1 + RFECS2 Scenario)

3. Control Level Factor

4. *RFECS1 Time Window Length*

806

Dynamic Inputs from RFECS1:

*1. Time stamp of RFECS1 ON/OFF*

702b

RFECS2

808

Manage Tx Power for Radios Belonging to RFECS2 for Total RF Exposure Compliance

1000

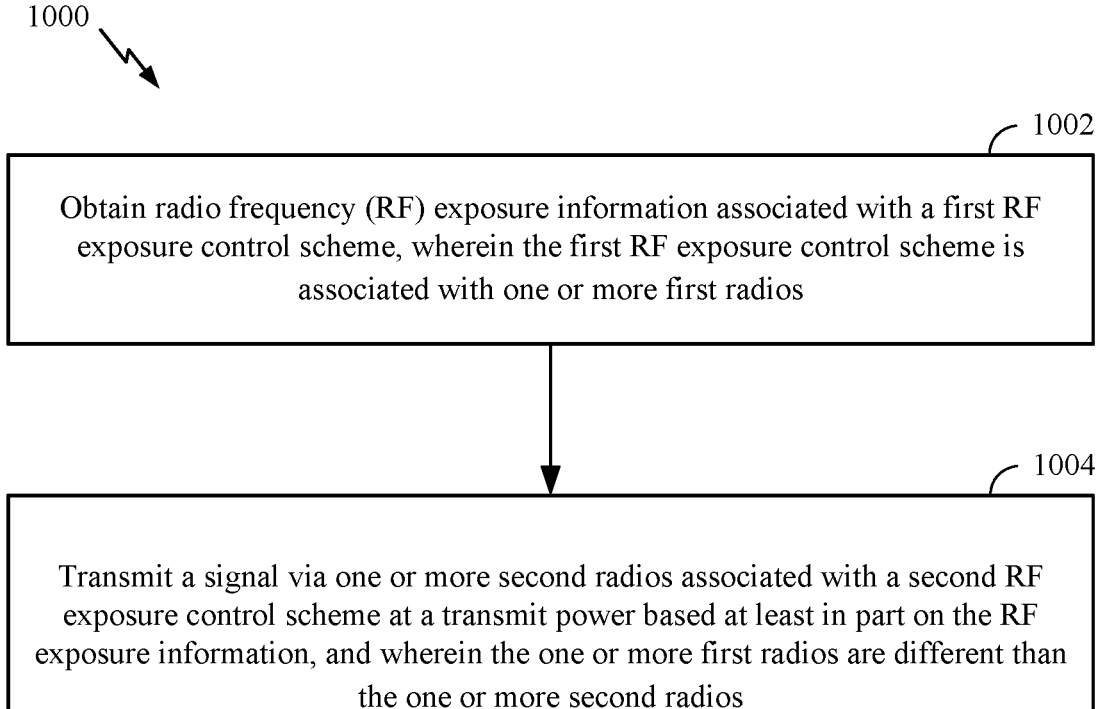

1002

Obtain radio frequency (RF) exposure information associated with a first RF exposure control scheme, wherein the first RF exposure control scheme is associated with one or more first radios

1004

Transmit a signal via one or more second radios associated with a second RF exposure control scheme at a transmit power based at least in part on the RF exposure information, and wherein the one or more first radios are different than the one or more second radios

FIG. 10

RADIO FREQUENCY EXPOSURE COMPLIANCE FOR TRANSITIONS BETWEEN EXPOSURE CONTROL SCHEMES

CROSS-REFERENCE TO RELATED APPLICATION(S)

The present application for patent claims benefit of and priority to U.S. Provisional Application No. 63/289,072, filed Dec. 13, 2021; and U.S. Provisional Application No. 63/364,314, filed May 6, 2022, each of which is hereby expressly incorporated by reference herein in its entirety.

BACKGROUND

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by certain governments and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include maintaining radio frequency (RF) exposure compliance during and following transitions among RF exposure control schemes.

Certain aspects of the subject matter described in this disclosure can be implemented in a method for wireless communication by a wireless device. The method generally includes obtaining radio frequency (RF) exposure information associated with a first RF exposure control scheme, wherein the first RF exposure control scheme is associated with one or more first radios. The method further includes transmitting a signal via one or more second radios associated with a second RF exposure control scheme at a transmit power based at least in part on the RF exposure information, wherein the one or more first radios are different than the one or more second radios.

Certain aspects of the subject matter described in this disclosure can be implemented in an apparatus for wireless communication. The apparatus generally includes a memory and a processor coupled to the memory. The processor is configured to obtain radio frequency (RF) exposure information associated with a first RF exposure control scheme, wherein the first RF exposure control scheme is associated with one or more first radios; and control transmission of a signal via one or more second radios associated with a second RF exposure control scheme at a transmit power based at least in part on the RF exposure information, wherein the one or more first radios are different than the one or more second radios.

Certain aspects of the subject matter described in this disclosure can be implemented in an apparatus for wireless communication. The apparatus generally includes means for obtaining radio frequency (RF) exposure information associated with a first RF exposure control scheme, wherein the first RF exposure control scheme is associated with one or more first radios; and means for transmitting a signal via one or more second radios associated with a second RF exposure control scheme at a transmit power based at least in part on the RF exposure information, wherein the one or more first radios are different than the one or more second radios.

Certain aspects of the subject matter described in this disclosure can be implemented in a computer-readable medium. The computer-readable medium has instructions stored thereon for obtaining radio frequency (RF) exposure information associated with a first RF exposure control scheme, wherein the first RF exposure control scheme is associated with one or more first radios; and transmitting a signal via one or more second radios associated with a second RF exposure control scheme at a transmit power based at least in part on the RF exposure information, wherein the one or more first radios are different than the one or more second radios.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 5 and 6 are diagrams illustrating examples of RF exposure control solution transitions over time.

FIG. 10 is a flow diagram illustrating example operations for wireless communication by a wireless device, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
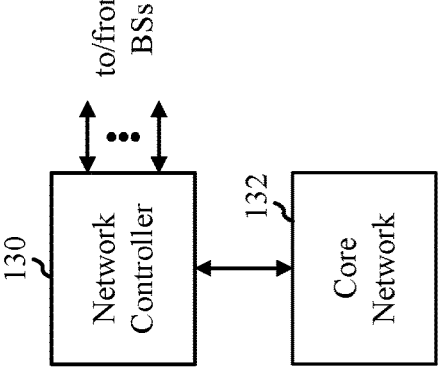
FIG. 1 is a block diagram conceptually illustrating an example wireless communication network, in accordance with certain aspects of the present disclosure.

Aspects of the present disclosure provide apparatus, methods, processing systems, and computer-readable mediums for complying with radio frequency (RF) exposure limits during and following transitions among RF exposure control solutions.

A wireless communication device may support multiple radio access technologies, such as 5G New Radio (NR), Evolved Universal Terrestrial Radio Access (e.g., 4G RAT), Universal Mobile Telecommunications System (UMTS) and/or code division multiple access (CDMA) (e.g., 2G/3G RAT), IEEE 802.11 (e.g., WiFi), Bluetooth access technologies, non-terrestrial (e.g., satellite) communications, peer-to-peer (P2P) or device-to-device (D2D) communications, vehicle-to-everything (V2X) communications, and/or other communications. In certain cases, the wireless device may have multiple RF exposure control solutions, where each RF exposure control solution may manage the RF exposure for one or more radios among the RATs. When a wireless device transitions from using one RF exposure control solution to using another RF exposure control solution, the RF exposure may be in non-compliance of an RF exposure limit for a short duration (e.g., less than a time window associated with a time-averaged RF exposure limit).

Aspects of the present disclosure provide apparatus and methods for ensuring RF exposure compliance when transitioning between RF exposure control solutions. The RF exposure control solutions may exchange certain RF exposure information that may enable the active RF exposure control solution(s) to account for or consider previous operations of other RF exposure control solutions during and following a transition between RF exposure control solutions. For example, following the transition, the active RF exposure control solution(s) may operate at a reduced level for the duration of the longest previous time window before the transition. The RF exposure information exchanged among RF exposure control solutions may include on-off information of an RF exposure control solution and/or the remaining exposure margin of an RF exposure control solution.

The apparatus and methods for ensuring RF exposure compliance described herein may facilitate improved wireless communication performance, such as reduced latencies, increased data rates, improved signal qualities (e.g., at a cell's edge), and/or increased range of communications, for example, due to the transmit powers allowed for the various radios.

As used herein, a radio may refer to one or more active bands, transceivers, and/or radio access technologies (RATs) (e.g., CDMA, LTE, NR, IEEE 802.11, Bluetooth, non-terrestrial communications, etc.) used for wireless communications. For example, for uplink carrier aggregation in LTE and/or NR, each of the active component carriers used for wireless communications may be treated as a separate radio. Similarly, multi-band transmissions for IEEE 802.11 may be treated as separate radios for each band (e.g., 2.4 GHz, 5 GHz, or 6 GHz). As used herein, an RF exposure control solution may refer to an RF exposure manager.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance in response to transitions among RF exposure control solutions, for example, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
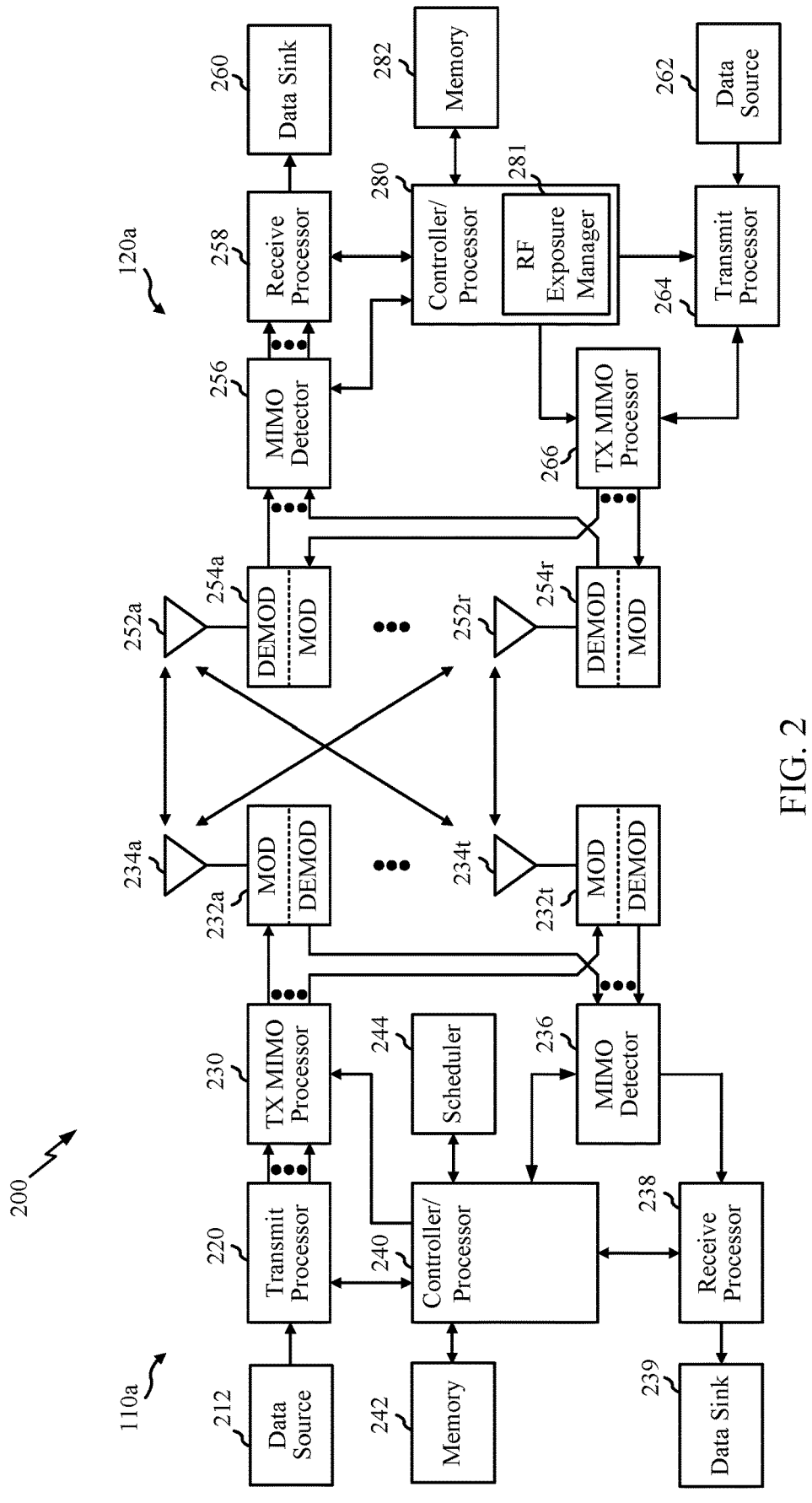
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254*a*-254*r* (e.g., for SC-FDM, etc.), and transmitted to the BS 110*a*. At the BS 110*a*, the uplink signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the controller/processor 280 of the UE 120*a* has an RF exposure manager 281 that is representative of the RF exposure manager 122, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120*a* is described with respect to FIGS. 1 and 2 as communicating with a BS and/or within a network, the UE 120*a* may be configured to communicate directly with/transmit directly to another UE 120, or with/to another wireless device without relaying communications through a network. In some aspects, the BS 110*a* illustrated in FIG. 2 and described above is an example of another UE 120.

Example RF Transceiver

Figure 3:
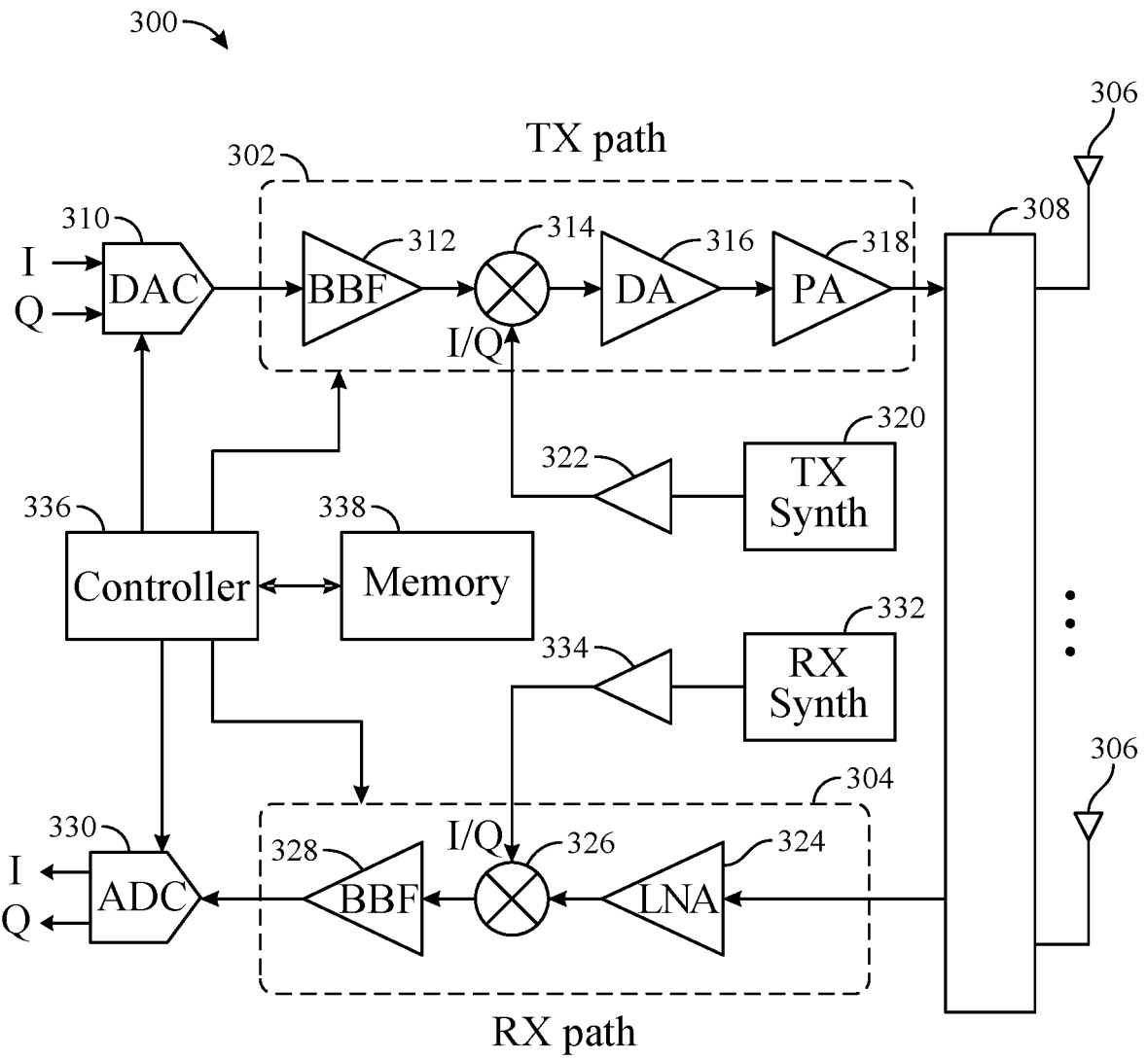
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a time-averaged RF exposure based on transmission power levels applied to the TX path 302 (e.g., certain levels of gain applied to the BBF 312, the DA 316, and/or the PA 318) to set a transmission power level that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11 (e.g., a/b/g/n/ac), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, 802.11a/b/g/n/ac, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

Figures 4A, 4B, 4C:
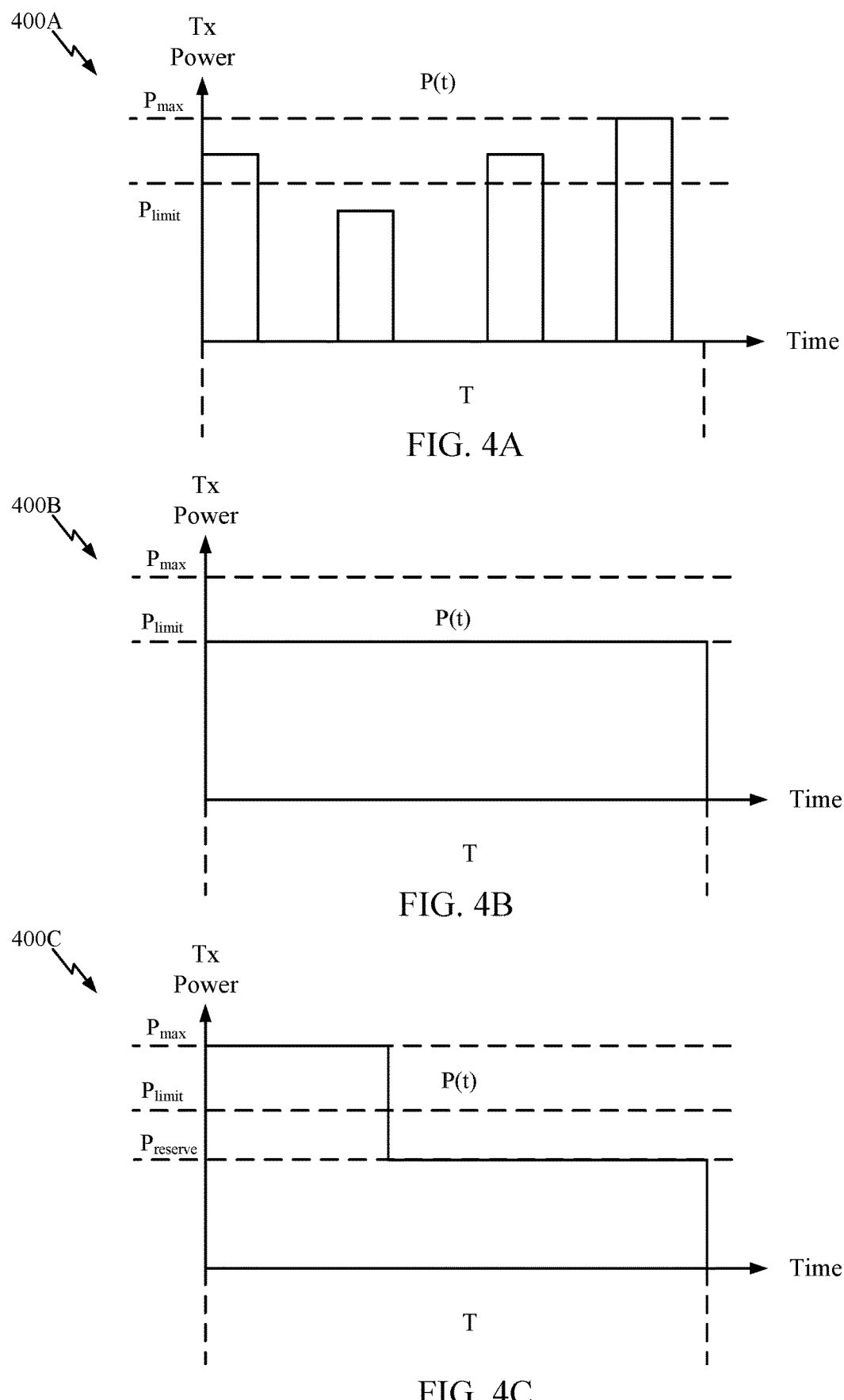
FIGS. 4A, 4B, and 4C are graphs illustrating examples of transmit powers over time in compliance with a time-averaged RF exposure limit, in accordance with certain aspects of the present disclosure.

In certain cases, compliance with an RF exposure limit may be performed as a time-averaged RF exposure evaluation within a specified running time window (T) (e.g., 2 seconds for 60 GHz bands, 100 or 360 seconds for bands less than or equal to 6 GHz, etc.) associated with the RF exposure limit. For example, FIG. 4A is a graph 400A of a transmit power over time (P(t)) that varies over the time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). In certain cases, the UE may transmit at $P_{max}$, which may be the maximum instantaneous transmit power supported by the UE or the maximum instantaneous transmit power the UE is capable of outputting. In certain cases, the UE may transmit at a transmit power less than or equal to $P_{limit}$ in certain transmission occasions. $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. $P_{limit}$ represents the maximum transmit power the UE can output continuously for the duration of the running time window (T) in compliance with the RF exposure limit as further shown in FIG. 4B. The graph 400A also illustrates gaps between transmission bursts, where the gaps represent periods during which no transmission was sent from the device.

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ for the duration of the running time window (T) in compliance with the RF exposure limit.

FIG. 4C is a graph 400C of a transmit power over time (P(t)) illustrating a time-average mode that provides a reserve power to enable a continuous transmission within the time window (T), in accordance with certain aspects of the present disclosure. As shown, the transmit power may be backed off from the maximum instantaneous power ($P_{max}$) to a reserve power ($P_{reserve}$) so that the UE can continue transmitting at the lower power ($P_{reserve}$) to maintain a continuous transmission during the time window (e.g., maintain a radio connection with a receiving entity). Here, the reserve power $P_{reserve}$ may be defined as the time-averaged transmit power, for example, so that the UE can transmit at a power level of ($P_{reserve}$/duty cycle). As used herein, the reserve power $P_{reserve}$ may also be referred to as a "control power level" or "control level." In FIG. 4C, the area between $P_{max}$ and $P_{reserve}$ for the time duration of $P_{max}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications) or at such fixed power plus a margin, as further described herein. The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level $P_{limit}$, but less than $P_{max}$ in the time-average mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

In certain aspects, the UE may transmit at a power less than or equal to a fixed power limit (e.g., $P_{limit}$) without considering past exposure and/or past transmit powers in terms of a time-averaged RF exposure. For example, the UE may transmit at a power less than or equal to $P_{limit}$ using a look-up table (comprising one or more values of $P_{limit}$ depending on the RF exposure scenario). The look-up table may provide one or more values of $P_{limit}$ depending on the transmit frequency, transmit antenna, radio configuration (single-radio or multi-radio) and/or RF exposure scenario (e.g., a device state index corresponding to head exposure, body or torso exposure, extremity or hand exposure, and/or hotspot exposure) encountered by the UE. Examples of RF exposure scenarios include cases where the UE is emitting RF signals proximate to human tissue, such as a user's head, hand, or body (e.g., torso), or where the UE is being used as a hotspot away from human tissue. Therefore, the RF exposure can be managed as a time-averaged RF exposure evaluation (e.g., illustrated in FIGS. 4A-4C), managed using a look-up table or flat or maximum value, or using another strategy or algorithm, where a particular process of managing the RF exposure may be referred to herein as an RF exposure control solution.

While FIGS. 4A-4C illustrate continuous transmission over a window, occasion, burst, etc., it will be understood that a duty cycle for transmission may be used by, implemented for, or configured for the UE. For example, a transmit power may be zero periodically and maintained at a higher level (e.g., a level as illustrated in FIGS. 4A-4C) during other portions of the time period associated with the duty cycle. In some cases, the wireless device may transmit in bursts, for example, as depicted in FIG. 4A, and the wireless device may have an equivalent duty cycle over the time period associated with the duty cycle. As used herein, the duty cycle of transmission(s) may refer to a portion (e.g., 5 ms) of a specific period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior. As an example, certain RATs may specify the uplink duty cycle in the form of a time division duplexing (TDD) configuration, such as a TDD uplink-downlink slot pattern in 5G NR or similar TDD patterns in E-UTRA or UMTS. The duty cycle may correspond to a TDD uplink-downlink (UL-DL) time-domain resource (e.g., slot) pattern as specified by certain wireless communication systems, such as 5G NR or E-UTRA, or may correspond to a specific throttling pattern. In certain aspects, the duty cycle may correspond to the actual duration for past transmissions scheduled, for example, within the TDD UL-DL slot pattern. In certain aspects, the UE may scale transmit power levels based on the duty cycle while preserving a defined control level (e.g., $P_{reserve}$) and/or $P_{limit}$.

A wireless communication device may support multiple radio access technologies, such as 5G NR, Evolved Universal Terrestrial Radio Access (e.g., 4G RAT), Universal Mobile Telecommunications System (UMTS) and/or code division multiple access (CDMA) (e.g., 2G/3G RAT), IEEE 802.11, Bluetooth, non-terrestrial communications, D2D communications, V2X communications, and/or other communications. In certain cases, the wireless device may have multiple RF exposure control solutions, where each RF exposure control solution may manage the RF exposure compliance for one or more radios among the RATs. For example, one RF exposure control solution may use a time-averaged RF exposure limit and RF exposure tracking over time to ensure RF exposure compliance, whereas another RF exposure control solution may use fixed transmit power limits, which may depend on an exposure scenario, in a look-up table to ensure RF exposure compliance. In other examples, multiple time-averaged RF exposure solutions may be used. In some examples, two or more of the solutions operate independent of one another. When a wireless device transitions from using one RF exposure control solution to using another RF exposure control solution, the time-averaged RF exposure may be in non-compliance for a short duration (e.g., less than a time window associated with a time-averaged RF exposure limit) if the RF exposure control solutions are not in appropriate communication or if a central manager does not appropriately coordinate between the solutions, for example. In certain cases, the wireless device may allocate the full exposure margin to an RF exposure control solution when only one RF exposure control solution is active, and the wireless device may reduce the exposure margin when multiple RF exposure control solutions are active. During (and for a period after) transitions between active RF exposure control solutions, the RF exposure may not be compliance with an RF exposure limit. An RF exposure control solution may refer to a particular scheme for complying with an RF exposure limit, for example, as depicted in FIGS. 4A-C, such as a time-averaged RF exposure scheme or a fixed transmit power limit scheme. In some examples, different solutions may use similar schemes, but manage a respective set of radios based on power or exposure allocations or margins, control information, exposure requirements, etc. assigned to that set of radios.

FIGS. 5 and 6 are diagrams illustrating examples of RF exposure control solution transitions over time. In these examples, the RF exposure may exceed a time-averaged RF exposure time limit due to a transition from one RF exposure control solution to another RF exposure control solution.

Referring to FIG. 5, the graph 502a depicts the active states 508, 510 for a first RF exposure control solution for wireless local area network (WLAN) RAT(s) (e.g., IEEE 802.11 or WiFi) and a second RF exposure control solution for wireless wide area network (WWAN) RAT(s) (e.g., 5G NR, E-UTRA, UMTS, CDMA, etc.), respectively, in time windows (T) for a time-averaged RF exposure limit.

The graph 502b depicts the RF exposure margins allocated for each of the RF exposure control solutions in the time windows (T). In this example, the first RF exposure control solution may operate at up to 80% (0.8) (e.g., a first margin 512a, 512b) of the RF exposure limit when operating alone. The first RF exposure control solution may not use time averaging, but instead the first RF exposure control solution may transmit at a transmit power that is less than or equal to a fixed transmit power from a look-up table. The second RF exposure control solution may use time averaging, and the second RF exposure control solution may operate at 80% of the RF exposure limit (corresponding to $P_{limit}$), out of which 40% (e.g., a base reserve 514) is utilized for controlled exposure for the entire time window (e.g., corresponding to $P_{reserve}$), and burst transmissions or other transmission traffic may utilize the remaining 40% (e.g., a second margin 516) to transmit up to $P_{max}$, when operating alone, for example, as described herein with respect to FIG.

4C. When the first and second RF exposure control solutions operate simultaneously, the first RF exposure control solution may operate with a reduced exposure margin of 20% (e.g., a third margin 518) such that the RF exposure limit is compliant for simultaneous transmission between these two solutions.

The graph 502c depicts the time-averaged normalized exposure 504 over time with respect to the reserves and margins allocated to the RF exposure control solutions as depicted in graph 502b. In this example, the time-averaged normalized exposure 504 exceeds the RF exposure limit 520 at segments 506a, 506b following transitions between the first and second RF exposure control solutions.

The RF exposure non-compliance could get much worse if both radios employ time-averaging RF exposure control solutions.

Referring to FIG. 6, the graphs 602a, 602b, 602c are the same type of graphs as depicted in FIG. 5, respectively. In this example, the first RF exposure control solution and the second RF exposure control solution may be active in the time windows (T) in the active states 608, 610. The first RF exposure control solution may use a time-averaged RF exposure manager, which may allocate 60% of the RF exposure margin (e.g., a first margin 612) in burst(s) within the time windows (T), for example, at the end of the time window or at the beginning of the time window. Such a scenario may result in RF exposure non-compliance lasting almost a full time window as shown in the graph 602c, where the segments 606a, 606b of the time-averaged normalized exposure 604 exceed the RF exposure limit 620.

To ensure RF exposure compliance for a transition between active RF exposure control solutions, the wireless device may allocate fixed exposure margins to each of the RF exposure control solutions in advance. For example, the wireless device may allocate a first portion of the total RF exposure margin to a first RF exposure control solution (e.g., an RF exposure manager for a wireless wide area network (WWAN) RATs) and a second portion of the total RF exposure margin to a second RF exposure control solution (e.g., an RF exposure manager for IEEE 802.11 RATs). Such a solution may not be efficient, for example, when only one RF exposure control solution is operating at a time.

As another option, the wireless device may delay transmitting via the radio(s) of the new RF exposure control solution for a certain duration, for example, a time window corresponding to the time-averaged RF exposure limit of the previous RF exposure control solution. For example, there may be a gap in transmission when a transitioning from using one RF exposure control solution to using another RF exposure control solution. Another solution may include transmitting at a level that is low enough such that compliance is achieved even if the previous solution(s) had been transmitting at the maximum or using the highest possible burst. Such solutions, however, may result in an undesirable user experience due to the transmission gap or low transmission power.

Accordingly, what is needed are techniques and apparatus for ensuring RF exposure compliance when transitions between RF exposure control solutions occur.

Example Radio Frequency Exposure Compliance
for Transitions Between Exposure Control Schemes Aspects of the present disclosure provide apparatus and methods for ensuring RF exposure compliance when transitioning between RF exposure control solutions. The RF exposure control solutions may exchange certain RF exposure information that may enable the active RF exposure control solution(s) to account for or consider previous operations of other RF exposure control solutions following a transition between RF exposure control solutions. For example, following a transition, the active RF exposure control solution(s) may operate at a reduced level for the duration of a longest time window used by the previous RF exposure control solution(s) before the transition. The RF exposure information exchanged among RF exposure control solutions may include an operating time window of an RF exposure control solution, on-off information of an RF exposure control solution, and/or the remaining exposure margin of an RF exposure control solution.

In the case of a transition to an RF exposure control solution applying a fixed power limit, the RF exposure control solution may allow the wireless communication device (e.g., a UE) to continue transmitting at a reduced level (in case of concurrent transmissions from multiple radios) and/or a control level (in case of non-concurrency where a single radio is transmitting) for longer than one time window. Alternately, if the full level and reduced level (and/or control level) are the same, then after the transition, the active RF exposure control solution may allow the wireless device to transmit at the full level indefinitely, or until another transition, for example.

The apparatus and methods for ensuring RF exposure compliance described herein may facilitate improved wireless communication performance, such as reduced latencies, increased data rates, improved signal qualities (e.g., at a cell's edge), and/or increased range of communications.

Figure 7A:
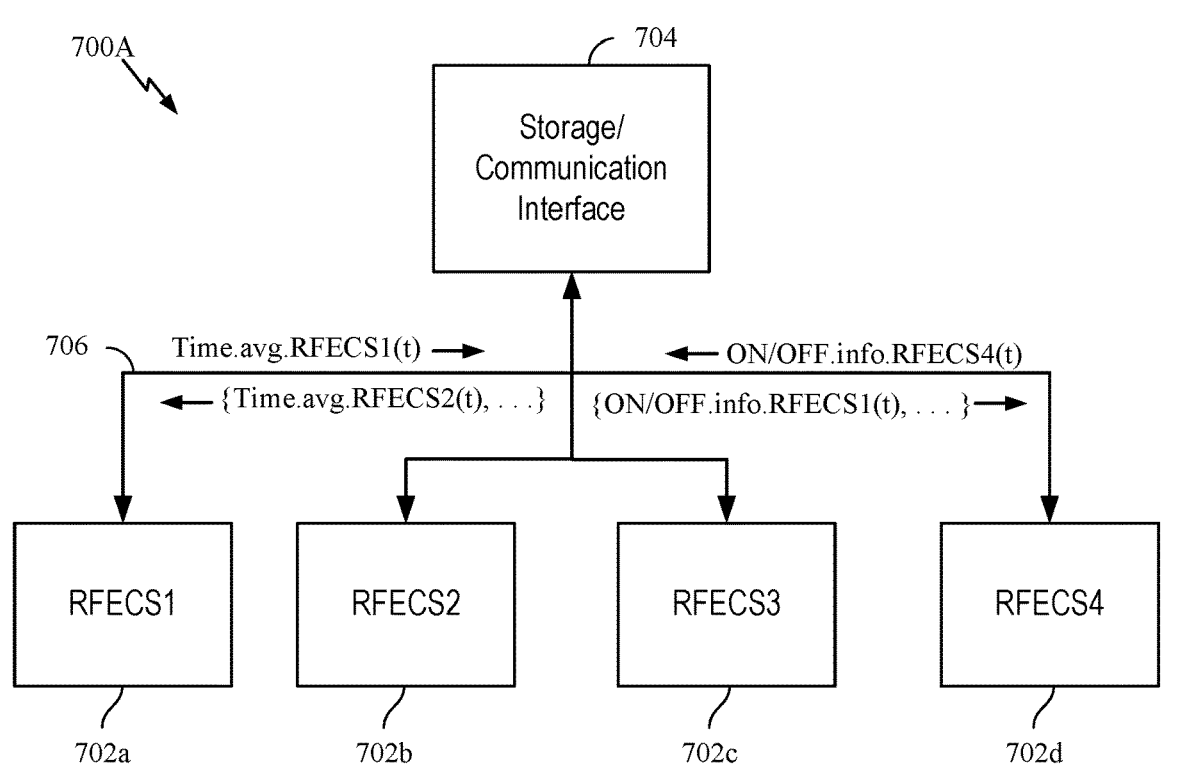
FIG. 7A is a diagram of an example logical architecture for exchanging RF exposure information among RF exposure control solutions of a wireless communication device.

FIG. 7A is a diagram of an example architecture 700A for exchanging RF exposure information among the RF exposure control solutions 702a-d (collectively RF exposure control solutions 702) (e.g., RFECS1-4) of a wireless communication device. In this example, a storage medium 704 (e.g., the memory 282 and/or the memory 338) may be in communication with each of the RF exposure control solutions 702 (RFECS1-4). Each of the RF exposure control solutions 702 may store the RF exposure information 706 on the storage medium 704, and each of the RF exposure control solutions 702 may access the storage medium to obtain the RF exposure information for (associated with) the other RF exposure control solutions.

Figure 8:
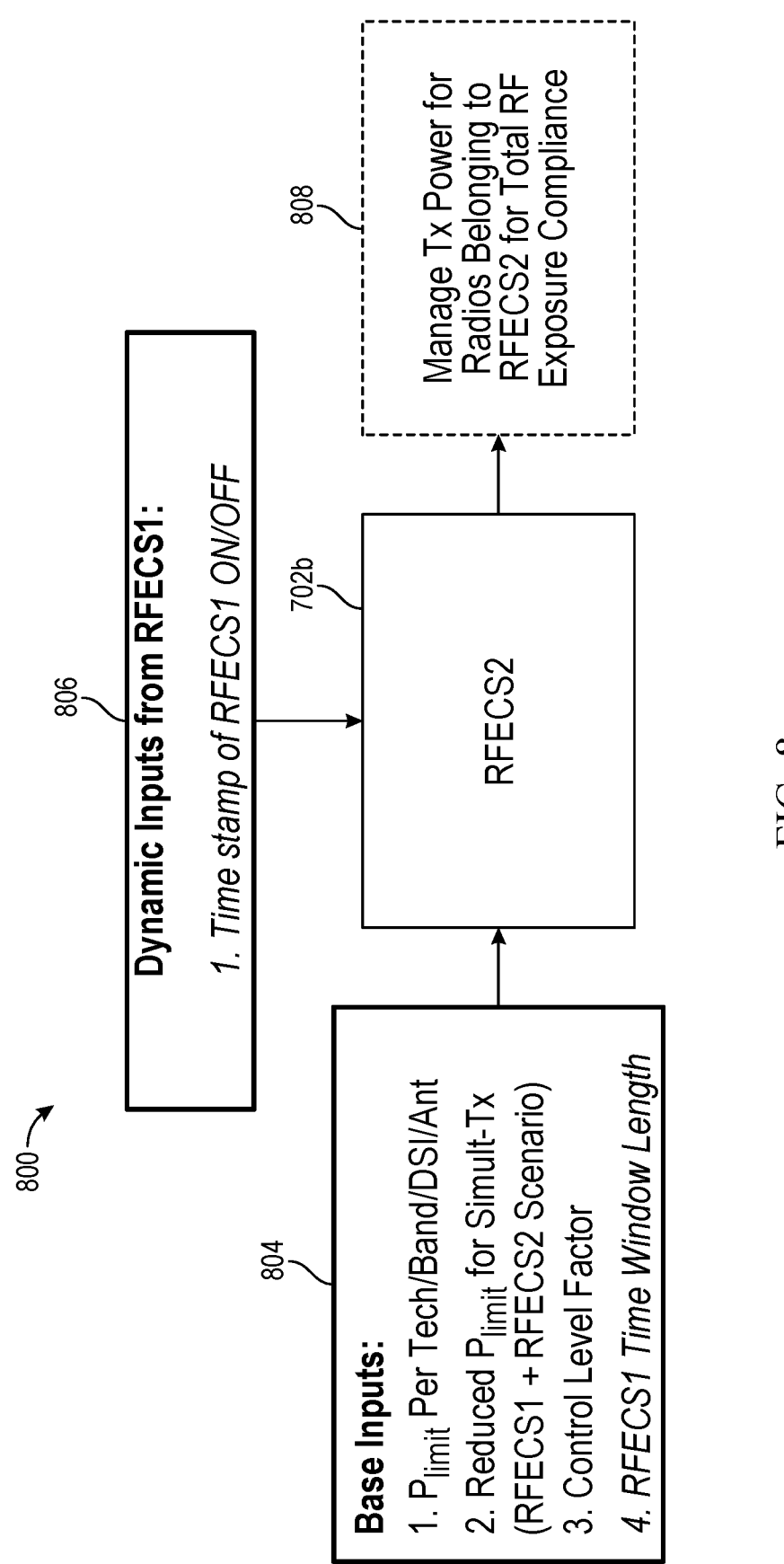
FIG. 8 is a diagram illustrating an example logical architecture for determining an RF exposure margin for an RF exposure control solution following a transition using on-off information.

In certain aspects, the RF exposure information 706 may include on-off information indicating when an RF exposure control solution is operating (e.g., on) or not operating (e.g., off), for example, as further described herein with respect to FIG. 8. An RF exposure control solution may be considered to be operating when a radio associated with the RF exposure control solution transmits a signal (in a certain time interval such as a portion of an averaging time window), whereas the RF exposure control solution may be considered not to be operating when the radio associated with the RF exposure control solution refrains from or stops transmitting (in a certain time interval). The on-off information may include a time stamp of when the RF exposure control solution started operating (e.g., turned on or started transmitting) and a time stamp of when the RF exposure control solution stopped operating (e.g., turned off or stopped transmitting). For certain aspects, the on-off information may include when a particular radio of the RF exposure control solution is on or off. As an example, the fourth RF exposure control solution 702d (RFECS4) may send an indication of when the fourth RF exposure control solution 702d (RFECS4) is on or off (depicted as ON/OFF.info.RFECS4 (t)) to the storage medium 704, and when the RFECS4 is active; and the fourth RF exposure control solution 702d

(RFECS4) may obtain the on-off information for the other RF exposure control solutions (RFECS1-3) depicted as {ON/OFF.info.RFECS1(t), . . . } from the storage medium 704.

Figure 9:
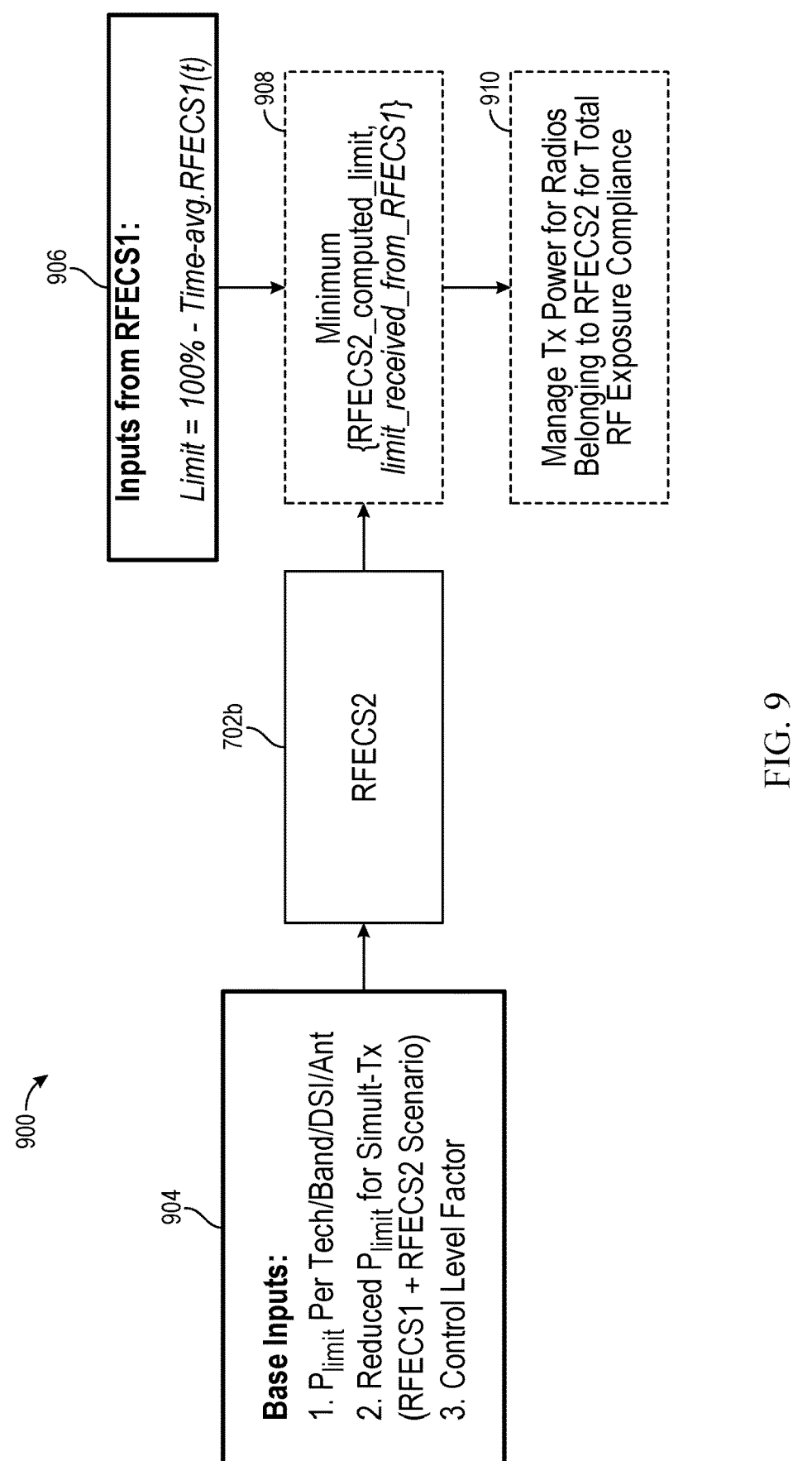
FIG. 9 is a diagram illustrating an example logical architecture for determining an RF exposure margin for an RF exposure control solution following a transition.

In some aspects, the RF exposure information 706 may include the consumed RF exposure margin for a particular RF exposure control solution, for example, as described herein with respect to FIG. 9. For example, the first RF exposure control solution (RFECS1) 702a may send the consumed RF exposure margin (depicted as Time.avg.R-FECS1(t)) to the storage medium. The RFECS1 702a may periodically update the consumed RF exposure margin, for example, at every time interval (e.g., 500 ms) of a time window of a time-averaged RF exposure limit. The RFECS1 702a may obtain the consumed RF exposure margins for the other RF exposure control solutions 702b-d (RFECS2-4) (depicted as {Time.avg.RFECS2(t), . . . }) from the storage medium 704. In certain aspects, the RF exposure information obtained from the storage medium 704 may be a sum of the consumed RF exposure margins for all other RF exposure control solutions. In some aspects, the RF exposure information obtained from the storage medium 704 may include a list of the consumed RF exposure margins associated with the other RF exposure control solutions. The RF exposure information can be used to obtain the remaining RF exposure margin for a given RF exposure control solution. For example, the remaining RF exposure margin for the RFECS1 702a may be equal to 100% minus the sum of the other consumed RF exposure margins (e.g., 100%−{Time-.avg.RFECS2(t)+Time.avg.RFECS3(t)+Time.avg.RFECS4(t)}).

The RF exposure information 706 may include a duration of the corresponding time window for the RF exposure limit used by an RF exposure control solution. The duration of the time window may enable the active RF exposure control solutions to determine how long to apply controlled exposure levels or consider past RF exposure of the previous RF exposure control solution(s) in determining RF exposure compliance.

The storage medium 704 may include a memory device, such as RAM (Random Access Memory) or flash memory. The storage medium 704 may include a memory block of an application processor, which may be in communication with all of the RF exposure control solutions. The storage medium 704 may include a coexistence (coex) manager for the RF exposure control solutions, where the coexistence manager may track other information, such as on-off information or power consumption, related to the radios of the RF exposure control solutions.

In certain aspects, an RF exposure control solution may serve as a central controller among the RF exposure control solutions. For example, the RFECS1 702a may serve as the central controller and obtain the RF exposure information from the other RF exposure control solutions 702b-d (RFECS2-4), and the RFECS1 702a may provide the other RF exposure control solutions 702b-d (RFECS2-4) with the respective RF exposure information and/or with updated RF exposure information, which may include instructions, exposure margin, or a transmit power allocation (or a combination thereof) based on the obtained RF exposure information. In some cases, the RFECS1 702a may process the RF exposure information. For example, the RFECS1 702a may determine an RF exposure margin available to any of the other RF exposure control solutions or the corresponding exposure duration associated with the RF exposure control solutions based on the RF exposure information, and the RFECS1 702a may provide the other RF exposure control solutions 702b-d (RFECS2-4) with the processed RF exposure information. In certain cases, the RFECS1 702a may ensure that the other RF exposure control solutions 702b-d (RFECS2-4) are in compliance with the respective RF exposure limits. When an RF exposure control solution is serving as a central controller, it may access RF exposure information 706 from the storage medium 704. Alternatively, the central controller may receive RF exposure information directly from other control solutions and/or may poll one or more other control solutions to obtain the RF exposure information. Such polling can be conducted periodically or triggered, for example by certain criteria to update allocations (e.g., a change in radio conditions, user behavior, mobility, traffic, etc.) or when central control transitions from one RFECS to another.

For certain aspects, RF exposure compliance associated with a particular radio may be controlled by one or more RF exposure control solutions (although, only one RF exposure control solution for a particular radio may operate at a given time depending on certain conditions in some examples). As an example, when a WWAN modem is online, an RF exposure control solution associated with the WWAN modem (e.g., RFECS1 702a) may serve as a central controller for all (or some) of the radios (e.g., WWAN, WLAN, and/or Bluetooth) and their respective RF exposure control solutions (e.g., RFECS2-4 702b-d). When the WWAN modem is offline (e.g., when in an airplane mode or a power saving mode), the RF exposure control solutions associated with WLAN and/or Bluetooth radio(s) (e.g., RFECS2 702b and/or RFECS3 702c) may operate based on limited information stored from the central controller RFECS1 702a, for example, via an accessible memory in an application processor (such as a modem services library). The RF exposure control solutions associated with the WLAN and/or Bluetooth radio(s) may operate independent of the WWAN RF exposure control solution or in response to the WWAN RF exposure control solution depending on whether WWAN modem is online or offline.

In certain aspects, the RF exposure control solutions may communicate with each other without a central or intermediary storage medium. For example, the RF exposure control solutions may exchange the RF exposure information across a communication interface, such as bus interface. The RF exposure control solutions may be in direct communication with each other to exchange the RF exposure information. In some cases, the RF exposure control solutions may exchange RF information with each other and independently manage RF exposure compliance without further aid or assistance from another RF exposure control solution.

Figure 7B:
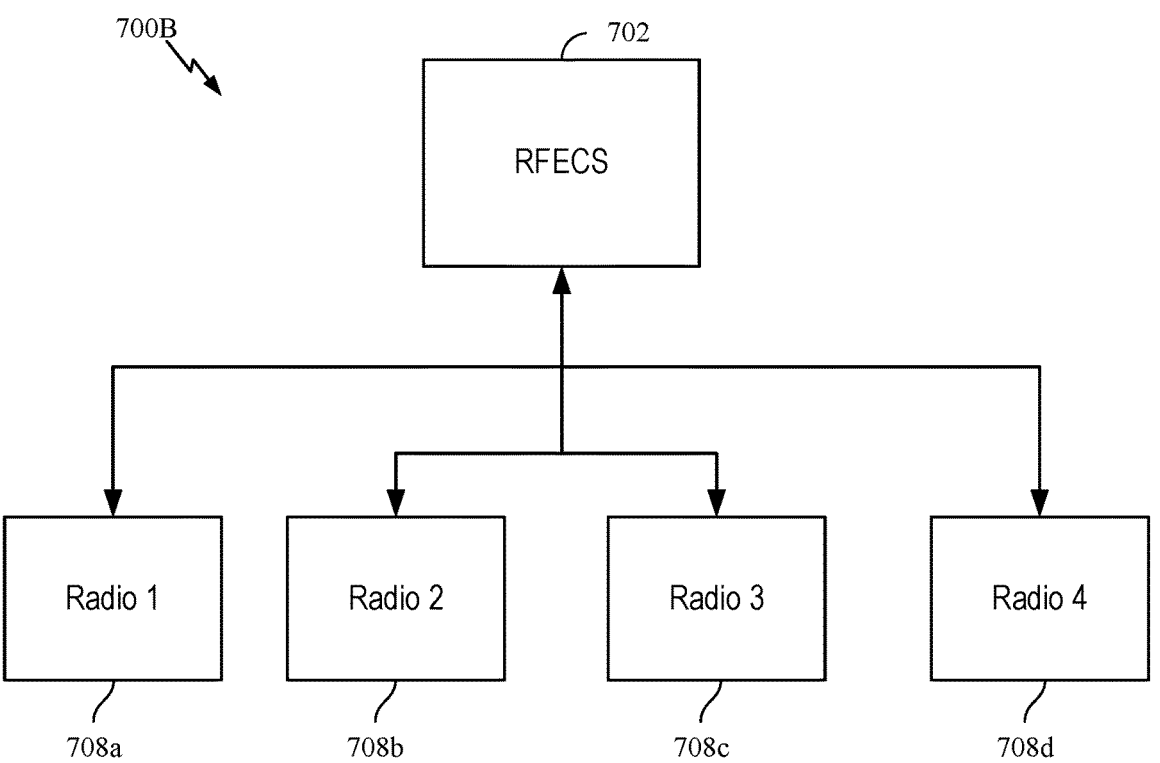
FIG. 7B is a diagram of an example logical architecture for managing the RF exposure for multiple radios.

For certain aspects, an RF exposure control solution may control the RF exposure compliance across multiple radios (e.g., multiple bands of a WWAN RAT, multiple WWAN RATs, a WWAN RAT and a WLAN RAT, a Bluetooth RAT and a WLAN RAT, a satellite (non-terrestrial) RAT and a WWAN RAT, etc.). FIG. 7B is a diagram of an example logical architecture 700B for managing the RF exposure for multiple radios, in accordance with certain aspects of the present disclosure. For example, the radios 708a-d (collectively the radios 708) (e.g., Radio 1, Radio 2, etc.) of a wireless device may request certain values for exposure margins from a central algorithm or controller, such as an RF exposure control solution 702. The RF exposure control solution 702 may determine the RF exposure margins for each of the radios 708, for example, based on the requested values from the individual radios. The RF exposure control solution 702 may consider the RF exposure information of other RF exposure control solutions in determining the RF exposure margins for each of the radios. It will be appreci-
ated that the architecture 700B may apply to any of the RF
exposure control solutions 702 described herein with respect
to FIG. 7A.

With respect to an RF exposure control solution serving
as a central controller and/or the configuration of the RFECS
managing exposure across multiple radios, there may be
cases in which the central control RF exposure control
solution and/or the managing RF exposure control solution
is turned off (or not in use), and such central control or
management functions are passed to another RF exposure
control solution. For example, the cellular modem may be in
control, but if that modem is turned off (e.g., put into a sleep
or airplane mode, or fails for some reason), the control
solution for one of the other RATs (e.g., WLAN or Blu-
etooth) may assume control. The substitute controller may
assume control based on priorities or some other criteria of
assessing which is the next controller (e.g., based on which
requires the highest quality of service, which seems to be
more complex (e.g., number of carriers or operations),
hardcoded line of succession, capabilities of each as regis-
tered with the system on startup, etc.), or the previous central
controller or manager may assign control before going
offline, for example based on the priorities or other criteria.
In one example, RFECS1 and RFECS2 may be running the
same underlying algorithm (e.g., a time-averaging algo-
rithm), and when one subsystem (e.g., WWAN) goes offline,
the other subsystem (e.g., WLAN or Bluetooth) may collect
the RF exposure information from the other RF exposure
control solutions and continue the time-averaging operation.
The RF exposure control solution which assumes control or
management, or to which control or management is actively
passed, may continue operating under existing exposure
parameters, or may determine whether such parameters
should be updated. The parameters may be updated based on
any of the operations described herein, or can be based on
buffered data to be transmitted or how long a particular
RFECS is likely to transmit, or based on how long a
particular RFECS is likely to be on or off or how long the
previous central controller or manager is likely to remain off.
If the previous central controller or manager is turned on
again, control may be passed back to the previous central
controller or manager in some configurations, or may remain
with the new central controller or manager in other configu-
rations. In some examples, a set of criteria is used to
determine which of the previous and new central controller
or manager should exercise control or management func-
tions.

In some examples, a central control RF exposure control
solution and/or a managing RF exposure control solution
may continue to control or manage operations of other
control solutions even when the central controller or man-
ager is associated with a radio that is turned off or configured
not to transmit for a portion of time. For example, continuing
with the example in which an RF exposure control solution
associated with a WWAN modem (e.g., RFECS1 702a)
serves as a central controller for all (or some) of the radios
(e.g., WWAN, WLAN, and/or Bluetooth) and their respec-
tive RF exposure control solutions (e.g., RFECS2-4 702b-
d), the RFECS1 702a associated with WWAN may manage
or direct operation of RF exposure control solutions asso-
ciated with the WLAN and/or Bluetooth radio(s) (e.g.,
RFECS2-4 702b-d) when the WWAN modem and/or asso-
ciated radios are off. In this way, consistent operation may
be maintained if certain transmit functions are disabled or
unavailable. In some examples, control may be passed to
anther exposure solution based on criteria other than an associated modem or modem being turned off, or may be
passed after a certain amount of time during which the
associated modem or radio is off. In some examples, the
central control RF exposure control solution and/or a man-
aging RF exposure control solution is implemented separate
from any modems, radios, etc. (e.g., in a central processor
applications processor, etc.) and thus will be unaffected by
whether a particular radio is on or off.

In another example in which the central control RF
exposure control solution and/or the managing RF exposure
control solution is turned off, the other RFECSs may operate
independently (e.g., instead of control or management func-
tions being passed to another solution or continuing to run
on the central controller or manager). In such a configura-
tion, the independent RFECSs may not be receiving updated
control or allocation information (e.g., from the central or
managing solution). Each independent RFECS may con-
tinue to operate using a most recently conveyed set of
exposure parameters (e.g., margin), or may operate based on
a default set of exposure parameters.

In certain aspects, the wireless device may use set limits
for the exposure on active RF exposure control solutions
after the transition for the duration of a time window (e.g.,
the longest time window) used before the transition. The
wireless device may limit the exposure on the active RF
exposure control solutions based on the exchanged RF
exposure information described herein with respect to FIG.
7A, such as the on-off information, the duration of past time
windows, and/or the remaining RF exposure margin.
Assuming each RF exposure control solution can operate at
a full level (e.g., maintaining the time-averaged level of
$P_{limit}$, where the radio could operate up to $P_{max}$ for some
duration and at or below a control level of $P_{reserve}$ for some
duration to maintain the time-averaged level of $P_{limit}$ as
depicted in FIG. 4C) or at a control level (e.g., $P_{reserve}$), the
active RF exposure control solution may operate at the
control level for one full time window corresponding to a
previous RF exposure control solution after a transition.

If an RF exposure control solution is operating by itself
without a transition, the RF exposure solution may operate
with a full level (e.g., maintaining the time-averaged level of
$P_{limit}$) and a control level (e.g., $P_{reserve}$). If the wireless
device transitions from using a first RF exposure control
solution (RFECS1) to using a second RF exposure solution
(RFECS2), the RFECS2 may operate at the control level
(e.g., $P_{reserve}$) of the RFECS2 for at least one time window
associated with RFECS1. After that time, RFECS2 may
operate at the full level (e.g., maintaining the time-averaged
level of $P_{limit}$, where radio could vary from at or below
control $P_{reserve}$ level to up to $P_{max}$ level). As used herein, the
full level or full exposure may refer to maintaining the
maximum time-averaged level (e.g., $P_{limit}$), where the radio
may operate up to a maximum instantaneous power (e.g.,
$P_{max}$) or an upper bound for exposure margin for some
duration, and may operate at the control level, which may
refer to a lower bound, a reserve power, and/or reserve
exposure for exposure margin for the remainder of the time
window so as to not exceed the time-averaged level of $P_{limit}$,
for example, as described herein with respect to FIG. 4C. In
certain aspects, the UE may apply the duty cycle of trans-
missions (e.g., past transmission(s) and/or future transmis-
sion(s)) to determine the transmit power level(s) for any
given level by the RF exposure control solution (e.g., control
level, reduced level, etc.). For example, when an RF expo-
sure control solution applies a control level (e.g., $P_{reserve}$),
the active radio associated with the RF exposure control solution may transmit at a higher peak transmit power level depending on the duty cycle where the average level corresponds to the control level.

When both RFECS1 and RFECS2 are operating simultaneously, both the solutions may operate at reduced time-averaged levels (e.g., reduced $P_{limits}$), such that the combined maximum time-averaged RF exposure from both RFECS1 and RFECS2 does not exceed the RF exposure limit. If RFECS1 and/or RFECS2 employ time-averaged RF exposure solutions, the respective radio(s) may operate at the maximum instantaneous power (e.g., $P_{max}$) for some duration of the time window and at a reduced control level (e.g., reduced $P_{reserve}$) for the remainder of the time window, so as to not exceed the corresponding reduced maximum time-averaged level of each RFECS (e.g., respective reduced $P_{limit}$). If the wireless device transitions from using RFECS1 to using RFECS1 and RFECS2 simultaneously, RFECS2 and RFECS1 may operate at respective reduced control levels (e.g., respective reduced $P_{reserve}$) for one RFECS1 time window. After that time, RFECS1 and RFECS2 may operate at the respective reduced time-averaged $P_{limit}$ levels.

If the wireless device transitions from RFECS1 and RFECS2 simultaneous transmission to RFECS2, RFECS2 may operate at the control level of RFECS2 for the longest time window out of all other RFECSs before the transition (e.g., the time window of RFECS1). If the wireless device transitions from RFECS1, RFECS2, and RFECS3 simultaneous transmission to RFECS2, RFECS2 may operate at the control level of RFECS2 for the longest time window between RFECS1 and RFECS3 used before the transition. After that time, RFECS2 may operate at a full level (e.g., maintaining the time-averaged level of $P_{limit}$, where the transmit power could vary from at or below control $P_{reserve}$ level to up to $P_{max}$ level).

FIG. 8 is a diagram illustrating an example logical architecture 800 for determining an RF exposure margin for RFECS2 702*b* following a transition from using RFECS1 (e.g., the RFECS1 702*a*) to using at least RFECS2 702*b* (in standalone or simultaneously with RFECS1). In this example, the RFECS2 702*b* may have base inputs 804 and dynamic inputs 806 from RFECS1. The base inputs 804 may include the RF exposure limit(s) (e.g., a time-averaged RF exposure limit such as $P_{limit}$) per RAT, band, exposure scenario (expressed as a device state index (DSI)), and/or antenna for the RFECS2 702*b*. The base inputs 804 may include the reduced exposure limit (e.g., a reduced time-averaged RF exposure limit such as a reduced $P_{limit}$) for simultaneous operations with RFECS1. The base inputs 804 may include a control level factor, which may be used to determine the control level(s) for standalone operation (e.g., $P_{reserve}$) or reduced control level(s) for simultaneous operation (e.g., reduced $P_{reserve}$). For example, the reduced control level setting (e.g., a reduced $P_{reserve}$) in a simultaneous scenario may be determined as a product of the corresponding full exposure (e.g., reduced $P_{limit}$) and the control level factor. The base inputs 804 may include a duration of the time window for RFECS1. In certain cases, RFECS2 702*b* may detect the country/region in which the radio is operating so to have awareness of the time window used by RFECS1. In such cases, the base inputs 804 may not include a duration of the time window for RFECS1. The dynamic inputs 806 may include the on-off information for RFECS1, for example, as described herein with respect to FIG. 7A. In certain aspects, the dynamic inputs 806 may be obtained from a storage medium and/or communication interface as depicted in FIG. 7A.

RFECS2 702*b* may use the base inputs 804 and the dynamic inputs 806 to determine transmit power(s) 808 for radio(s) in compliance with the corresponding RF exposure limits following a transition between RF exposure control solutions. RFECS2 702*b* may use the base inputs 804 and the dynamic inputs 806 to determine the reduced level(s) (e.g., control level(s) for standalone operation or reduced control level(s) for simultaneous transmission) to apply and how long to apply the determined reduced level(s) for RFECS2 702*b*, for example, until the expiration of the time window for RFEC1 following the transition assuming only RFECS1 was active prior to the transition, or until the expiration of the longest time window between RFECS1 and RFECS2 702*b* following the transition if both RFECS1 and RFECS2 702*b* were active prior to the transition. RFECS2 702*b* may operate at determined control level(s) after a transition until one time window corresponding to RFECS1 expires from the last time RFECS1 was operating as determined from the on-off information.

As an example, suppose RFECS1 having a 100 seconds (s) time window for a time-averaged RF exposure limit was operating from t=0s to 150*s* and turned off. If RFECS2 has a 30 s time window for a time-averaged RF exposure limit and turned ON at t=190 s, RFECS2 may operate at the control level until t=250 s (e.g., for the duration of the time window of RFECS1=100 s), due to RFECS1 turning off at t=150 s.

RFECS1 and RFECS2 may satisfy the following criteria (normalized to RF exposure limit) for RF exposure compliance in cases:

without transitions:
  (for standalone RFECS1): RFECS1_full_level≤100%,
  (for standalone RFECS2): RFECS2full_level≤100%,
  (for simultaneous RFECS1+RFECS2):
    reduced_RFECS1_full_level+
    reduced_RFECS2_full_level≤100%; or with transitions (for rolling time windows):
  (for RFECS1 to RFECS2 transition):
    RFECS1_full_level+RFECS2control_level−
    RFECS1_control_level≤100%
  (for RFECS2 to RFECS1 transition):
    RFECS2_full_level+RFECS1_control_level−
    RFECS2_control_level≤100%
  (for RFECS1 to RFECS1+RFECS2 compliance):
    RFECS1_full_level+reduced_RFECS1_control_level+
    reduced_RFECS2_control_level−
    RFECS1_control_level≤100%
  (for RFECS2 to RFECS1+RFECS2 compliance):
    RFECS2_full_level+reduced_RFECS1_control_level+
    reduced_RFECS2_control_level−
    RFECS2_control_level≤100%
  (for RFECS1+RFECS2 to RFECS1 compliance):
    reduced_RFECS1_full_level+
    reduced_RFECS2_full_level+RFECS1_control_level−
    reduced_RFECS1_control_level−
    reduced_RFECS2_control_level≤100%
  (for RFECS1+RFECS2 to RFECS2 compliance):
    reduced_RFECS1_full_level+
    reduced_RFECS2_full_level+RFECS2_control_level−
    reduced_RFECS1_control_level−
    reduced_RFECS2_control_level≤100%

As an example, suppose RFECS1 is for controlling the RF exposure of WWAN radio(s), and RFECS2 is for controlling the RF exposure of WiFi radio(s). RFECS1 may have a full exposure (e.g., maintaining the time-averaged level of $P_{limit}$) set to 80% for standalone operations, a control level (e.g., $P_{reserve}$) set to 40% for standalone operations, a reduced full exposure (e.g., reduced $P_{limit}$) set to 70% for simultaneous operations (e.g., when RFECS1 and RFECS2 are operating simultaneously), a reduced control level (e.g., reduced $P_{reserve}$) set to 35% for simultaneous operations, and a control factor of 0.5. RFECS2 may have a full exposure (e.g., maintaining the time-averaged level of $P_{limit}$) set to 60% for standalone operations, a control level (e.g., $P_{reserve}$) set to 48% for standalone operations, a reduced full exposure (e.g., reduced $P_{limit}$) set to 30% for simultaneous operations, a reduced control level (e.g., reduced $P_{reserve}$) set to 24% for simultaneous operations, and a control factor of 0.8. All the percentages in this example may be relative to the RF exposure limit.

The settings for RFECS1 and RFECS2 when normalized to RF exposure limit may be expressed as follows:

RFECS1:
(standalone):
WWAN.full=80%
WWAN.control=40% (control factor*=0.5)
(simultaneous):
reduced.WWAN=70%
reduced.WWAN.control=35% (control factor=0.5)
RFECS2:
(standalone):
WiFi.full=60%
WiFi.control=48% (control factor=0.8)
(simultaneous):
reduced.WiFi=30%
reduced.WiFi.control=24% (control factor=0.8)
where for the simultaneous scenario:
reduced.WWAN+reduced.WiFi=70%+30%≤100%

Using the example settings for RFECS1 and RFECS2, RFECS1 and RFECS2 may satisfy the following criteria for RF exposure compliance:

without transitions:
(for standalone RFECS1): RFECS1_full_level≤100%, e.g., 80%
(for standalone RFECS2): RFECS2_full_level≤100%, e.g., 80%
(for simultaneous RFECS1+RFECS2): reduced_RFECS1_full_level+ reduced_RFECS2_full_level≤100%, e.g., 70%+ 30%=100% with transitions:
(for RFECS1 to RFECS2 transition): RFECS1_full_level+RFECS2_control_level− RFECS1_control_level≤100%, e.g., 80%+48%− 40%=88%
(for RFECS2 to RFECS1 transition): RFECS2_full_level+RFECS1_control_level− RFECS2_control_level≤100%, e.g., 60%+40%− 48%=52%
(for RFECS1 to RFECS1+RFECS2 compliance): RFECS1_full_level+reduced_RFECS1_control_level+ reduced_RFECS2_control_level− RFECS1_control_level≤100%, e.g., 80%+35%+24%− 40%=99%
(for RFECS2 to RFECS1+RFECS2 compliance): RFECS2_full_level+reduced_RFECS1_control_level+ reduced_RFECS2_control_level− RFECS2_control_level≤100%, e.g., 60%+35%+24%− 48%=71%
(for RFECS1+RFECS2 to RFECS1 compliance): reduced_RFECS1_full_level+ reduced_RFECS2_full_level+RFECS1_control_level− reduced_RFECS1_control_level− reduced_RFECS2_control_level≤100%, e.g., 70%+ 30%+40%−35%−24%=71%
(for RFECS1+RFECS2 to RFECS2 compliance): reduced_RFECS1_full_level+ reduced_RFECS2_full_level+RFECS2_control_level− reduced_RFECS1_control_level− reduced_RFECS2_control_level≤100%, e.g., 70%+ 30%+48%−35%−24%=89%

It will be appreciated that a wireless device may have more than two RF exposure control solutions. For example, a wireless device may have a first RFECS for WWAN, a second RFECS for WiFi, and a third RFECS for Bluetooth transmissions, a fourth RFECS for satellite transmission, etc. In such cases, the reduced control levels used following transitions may be determined according to the number of RF exposure control solutions used for a wireless device. Following a transition, the active RF exposure control solutions may apply the reduced control levels (e.g. $P_{reserve}$) for a duration of the longest time window among the previously active RF exposure control solutions before the transition from when the last RF exposure control solution was operating among the previously active RF exposure control solutions. In a three or more RFECSs scenario, the transitions may include a transition from one set of simultaneously operating RF exposure control solutions to another set of simultaneously operating RF exposure control solutions.

In certain aspects, following a transition, an active RF exposure control solution may consider in addition to its own exposure history the worst-case exposure from previously active RF exposure control solutions before the transition. For example, following a transition from RFECS2 to RFECS1, RFECS1 may consider the worst-case exposure for RFECS2 by assuming RFECS2 was operating at maximum exposure, such as, the full exposure (e.g., $P_{limit}$) or reduced exposure (e.g., reduced $P_{limit}$) in the case of simultaneous RFECS transmission to calculate the limits for future transmissions in RFECS1. RFECS1 at each instant in time will track its own radio(s) exposure history as well as add RFECS2's full (or reduced) exposure levels to the exposure history depending on whether RFECS2 is ON/OFF at that instant in time. RFECS1 has past exposure that is based on its own exposure as well as worst-case RFECS2 exposure history. If RFECS2 is using a time-averaged RF exposure control solution, the worst-case RFECS2 exposure at each instant in time may exceed 100% as RFECS2 can transmit up to $P_{max}$ (e.g., RFECS2 may exceed the RF exposure limit for that instant in time) in short time durations.

In certain aspects, the wireless device may use the past RF exposures of previously active RF exposure control solutions before a transition to determine the RF exposure margin for active RF exposure control solutions following the transition. For when transitioning from RFECS1 to RFECS2, as RFECS1 knows how much time-averaged exposure has been consumed in the past, RFECS1 may provide the remaining exposure margin (e.g., 100%− Time.avg.RFECS1(t)) to RFECS2 as a limit at each time instant (e.g., each update interval of a moving time window for RFECS2). RFECS2 may use the smallest value among the remaining exposure margin from RFECS1 and a computed exposure margin (e.g., based on RFECS2 exposure history). RFECS2 may provide the smallest value to the respective radios for RF exposure compliance. In the case of more than two RFECSs operating on a device, for example, when four RFECSs are operating as depicted in FIG. 7A, RFECS2 may obtain the remaining exposure margin limit out of all other RFECSs at each time instant (e.g., 100%–Time.avg.RFECS1(t)–Time.avg.RFECS3(t)–Time.avg.RFECS4(t)).

FIG. 9 is a diagram illustrating an example logical architecture 900 for determining an RF exposure margin for RFECS2 following a transition from using RFECS1 to using at least RFECS2 (in standalone or simultaneously with RFECS1). RFECS2 may use the remaining exposure margin provided by RFECS1, for example, or may transmit according to another limit (e.g., a reserve level). In one example, RFECS2 702b may have base inputs 904, which may be representative of the base inputs 804 except for the duration of the RFECS1 time window. RFECS2 702b may determine an RF exposure margin available to one or more radios based on the past exposure history for RFECS2 using the base inputs 904. For example, RFECS2 702b may determine a transmit power limit from control $P_{reserve}$ level to up to $P_{max}$ level based on past exposure history to maintain the time-averaged level of $P_{limit}$ for RF exposure compliance. The wireless device may obtain a limit 906 for a subsequent transmission by RFECS2 (e.g., based on consumed exposure margin of RFECS1), for example, as described herein with respect to FIG. 7A, where RFECS1 may periodically report its consumed RF exposure margin. In certain aspects, the wireless device may obtain the past RF exposure history over an averaging time window associated with the RFECS1, and the wireless device may determine the consumed RF exposure margin associated with RFECS1 based on the past RF exposure history. The limit 906, for example, may correspond to the remaining RF exposure margin (e.g., limit_received_from_RFECS1=100%–Time.avg.RFECS1 (t)). In other examples, the limit may comprise a reserve (e.g., $P_{reserve}$). In yet other examples, the limit may comprise a margin in excess of a reserve, such as when RFECS1 did not use all of the power or margin allocated to it. The wireless device may determine the smallest value 908 among the RF exposure margin determined by the RF exposure history for RFECS2 (e.g., RFECS2_computed_limit) and the limit 906 based on RFECS1. By scaling the smallest value 908 and the maximum time-averaged transmit power level (e.g., $P_{limit}$ in standalone operation and reduced $P_{limit}$ in simultaneous operation), the wireless device may determine the transmit power(s) 910 for the respective radios of RFECS2 702b.

RFECS1 and RFECS2 may satisfy the following criteria for RF exposure compliance in cases:

without transitions:
    (for standalone RFECS1): RFECS1_full_level≤100%,
    (for standalone RFECS2): RFECS2_full_level≤100%,
    (for simultaneous RFECS1+RFECS2): reduced_RFECS1_full_level+ reduced_RFECS2_full_level≤100%; or
with Transitions assuming RFECS1 and RFECS2 operate every 'Δt' time interval within a time window (T) for time-averaged RF exposure compliance:
    RFECS1 sends a limit to RFECS2=100%–time.avg.RFECS1(t)
    RFECS2 sends a limit to RFECS1=100%–time.avg.RFECS2(t)
    Exposure limits for RFECS1 radios in future Δt=min (RFECS1 computed limit, 100%–time.avg.RFECS2 (t));
    Exposure limits for RFECS2 radios in future Δt=min (RFECS2 computed limit, 100%–time.avg.RFECS1 (t)).
RFECS1 and RFECS2 may compute past consumed exposure usages of the respective radio(s) based on transmitted exposure histories, given by, time.avg.RFECS1(t) and time.avg.RFECS2(t), respectively. The RF exposure information may be shared among RFECSs, for example, as described herein with respect to FIG. 7A. In certain aspects, the RF exposure shared among the RFECSs may be in the form of a limit (e.g., the remaining RF exposure margin) or the past RF exposure history of an RFECS. The exposure limits can be converted into transmit power limits by multiplying the exposure limits by the maximum time-averaged transmit power level (e.g., $P_{limit}$ in standalone operation and reduced $P_{limit}$ in simultaneous operation). For example, the transmit power limit for RFECS1 radios in a future time interval (Δt) of the time window (T) may be equal to $P_{limit}$_RFECS1_radio*min(RFECS1 computed limit, 100%–time.avg.RFECS2(t)). In a simultaneous scenario, RFECS1 and RFECS2 may operate at reduced levels. The $P_{limit}$_RFECS1_radio and $P_{limit}$_RFECS2_radio in the above equations may represent reduced $P_{limit}$ levels that consider the simultaneous transmit operations.

As described above, exposure management may be distributed among several exposure control solutions, which may communicate directly with each other and/or access a shared resource such as a memory, coexistence manager, etc. In other examples, a central manager may coordinate among solutions and/or assign transmit power(s) and/or RF exposure margins to different solutions, or one solution of several may act as a central manager or power assignment entity. Such one solution may be determined by a device manufacturer, or may be determined during operation, for example based on operation of a device and/or communications between solutions. In some examples, a solution may be configured to send a message indicating capability to manage. If no response is received, that solution may act as the central manager. If a response is received from another solution, all capable solutions may negotiate which acts as the central manager or power assignment entity.

In some examples, one or more solutions are preconfigured with a $P_{limit}$ (and/or other transmission levels) that corresponds to how many other solutions are or have been active. The solution may receive or access an indicator representative of how many other solutions and/or radios are or have been on, and the solution determines its own operating parameters based thereon and on the preconfigured information. In other examples, operating parameters (such as $P_{limit}$, $P_{reserve}$, and/or reduced $P_{reserve}$) are provided to a solution. For example, a lower $P_{limit}$ or margin may be provided to a solution during a transition time, and then raised after the transition. Other such examples are possible, as described above and as may be determined based on the descriptions herein.

FIG. 10 is a flow diagram illustrating example operations 1000 for wireless communication, in accordance with certain aspects of the present disclosure. The operations 1000 may be performed, for example, by a wireless device (e.g., the UE 120a in the wireless communication network 100). The operations 1000 may be implemented as software components that are executed and run on one or more processors (e.g., controller/processor 280 of FIG. 2). Further, the transmission and/or reception of signals by the wireless device in the operations 1000 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals for reception or transmission.

The operations 1000 may optionally begin, at block 1002, where the wireless device may obtain RF exposure information (e.g., the RF exposure information 706) associated with a first RF exposure control scheme (e.g., the RFECS1 702a). The wireless device may access the RF exposure information from a storage medium (e.g., the storage medium 704). The first RF exposure control scheme may be associated with one or more first radios (e.g., the radio(s) 708a-d associated with the RFECS1 702a). An example of an RF exposure control scheme may include an RF exposure control solution, as described herein with respect to FIGS. 7A-9.

At block 1004, the wireless device may transmit a signal (e.g., a control signal and/or a data signal) via one or more second radios (e.g., the radio(s) 708a-d associated with the RFECS2 702b) associated with a second RF exposure control scheme (e.g., the RFECS2 702b) at a transmit power based at least in part on the RF exposure information. The one or more first radios are different than the one or more second radios.

For certain aspects, the first RF exposure control scheme may be separate from the second RF exposure control scheme. As an example, the first RF exposure control scheme may be separate from the second RF exposure control scheme based on the first RF exposure control scheme ensuring compliance with a first RF exposure limit for the first radio(s), and the second RF exposure control scheme ensuring compliance with a second RF exposure limit for the second radio(s). In certain aspects, the first RF exposure limit may be the same as or different from the second RF exposure limit, for example, depending on the transmit frequencies associated with the first radio(s) and the second radio(s). For certain aspects, the first RF exposure control scheme may be associated with a different radio access technology (e.g., 5G NR) than the second RF exposure control scheme (e.g., IEEE 802.11). In certain cases, the first RF exposure control scheme may apply a different mode of RF exposure compliance (e.g., a fixed maximum transmit power limit) than the second RF exposure control scheme (e.g., a time-averaging scheme), whereas in other cases, the first and second RF exposure control schemes may apply the same mode of RF exposure compliance.

In certain aspects, the RF exposure information may include on-off information associated with an RF exposure control scheme, for example, as described herein with respect to FIGS. 7A and 8. With respect to the operations 1000, the RF exposure information may include on-off information of the one or more first radios associated with the first RF exposure control scheme. The on-off information may indicate a first time corresponding to when the one or more first radios associated with the first RF exposure control scheme were operating (e.g., when transmission(s) started), a second time corresponding to when the one or more first radios associated with the first RF exposure control scheme were not operating (e.g., when transmission(s) ended), or a combination thereof. The wireless device may assume, for a duration corresponding to when the one or more first radios associated with the first RF exposure control scheme were operating derived from the on-off information, that the one or more first radios were operating at a particular exposure level (e.g., $P_{limit}$). The wireless device may determine the transmit power based at least in part on the particular exposure level. The particular exposure level may be a maximum exposure level (e.g., $P_{limit}$) that satisfies a time-averaged RF exposure limit for the duration.

In certain aspects, the wireless device may apply various exposure levels depending on the transmission history associated with the RF exposure control schemes, such as the examples described herein with respect to RFECS1 and RFECS2. When the RF exposure information indicates the wireless device is transmitting in a standalone mode via the one or more second radios associated with the second RF exposure control scheme (e.g., RFECS2 only), the wireless device may determine the transmit power to be in compliance with an exposure margin (e.g., the full level for RFECS2) associated with the second RF exposure control scheme. When the RF exposure information indicates the wireless device transitioned from transmitting via the one or more first radios associated with the first RF exposure control scheme to transmitting via the one or more second radios associated with the second RF exposure control scheme (e.g., transitioning from RFECS1 to RFECS2), the wireless device may determine the transmit power to be in compliance with a first control level (e.g., a control level or $P_{reserve}$) for a duration. When the RF exposure information indicates the wireless device transitioned from transmitting via the one or more first radios associated with the first RF exposure control scheme to transmitting via the one or more first radios associated with the first RF exposure control scheme and the one or more second radios associated with the second RF exposure control scheme (e.g., transitioning from RFECS1 to RFECS1 and RFECS2), the wireless device may determine the transmit power to be in compliance with a second control level (e.g., a reduced control level) for the duration, where the second control level is less than the first control level. When the RF exposure information indicates the wireless device transitioned from transmitting via the one or more first radios associated with the first RF exposure control scheme and the one or more second radios associated with the second RF exposure control scheme to transmitting via the one or more second radios associated with the second RF exposure control scheme (e.g., transitioning from RFECS1 and RFECS2 to RFECS2), the wireless device may determine the transmit power to be in compliance with the first control level for the duration. The duration may be for at least one time window associated with the first RF exposure control scheme (e.g., a time-averaging time window).

In certain aspects, the RF exposure information may include an indication of a limit for transmitting via radio(s) associated with an RF exposure control scheme, where the limit may correspond to a reserve level (e.g., $P_{reserve}$), an RF exposure margin used by an RF exposure control scheme, or a remaining RF exposure margin, for example, as described herein with respect to FIGS. 7A and 9. For example, the RF exposure information may include the past RF exposure history used by a particular RF exposure control scheme over an averaging time window or time interval (e.g., a portion of the averaging time window). The RF exposure information may include a time variation of RF exposure (e.g., RF exposure history) used by the first RF exposure control scheme over a past averaging time window (e.g., the time window in FIGS. 4A-4C). With respect to the operations 1000, the RF exposure information may include a reserve level or an indication of an RF exposure margin (e.g., time-avg.RFECS1) used by the first RF exposure control scheme. In certain aspects, the RF exposure information may include an indication of a first remaining RF exposure margin associated with the first RF exposure control scheme.

The first remaining RF exposure margin is determined as a difference of a value and an RF exposure margin used by the first RF exposure control scheme (e.g., 100%–time-avg.RFECS1). The value may be representative of a full RF exposure margin that can be used in a time-averaging time window (e.g., 100%). The wireless device may determine a smallest value among the reserve level or the first remaining RF exposure margin and a second RF exposure margin associated with the second RF exposure control scheme (e.g., minimum{RFECS2_computed_limit, limit_received_from_RFECS1}). The wireless device may determine the transmit power based at least in part on the smallest value.

The wireless device may obtain a first maximum time-averaged transmit power level (e.g., $P_{limit}$), a second maximum time-averaged transmit power level (e.g., a reduced $P_{limit}$), and a scaling factor (e.g., a control level factor). For example, the first maximum time-averaged transmit power level, the second maximum time-averaged transmit power level, and the scaling factor may be representative of the base inputs as described herein with respect to FIG. 8 or FIG. 9. The second maximum time-averaged transmit power level may be less than the first maximum time-averaged transmit power level. The wireless device may determine the transmit power based at least in part on the RF exposure information, the first maximum time-averaged transmit power level, the second maximum time-averaged transmit power level, and the scaling factor, for example, as described herein with respect to FIG. 8 or FIG. 9. In certain aspects, the wireless device may obtain a duration of a time window associated with the first RF exposure control scheme (e.g., a time-averaging time window associated with an RF exposure limit), for example, as described herein with respect to FIG. 8. The wireless device may determine the transmit power further based at least in part on the duration.

The wireless device may determine a first control level (e.g., $P_{reserve}$) as a product of the first maximum time-averaged transmit power level and the scaling factor. The wireless device may determine a second control level (e.g., a reduced control level or reduced $P_{reserve}$) as a product of the second maximum time-averaged transmit power level and the scaling factor. The wireless device may determine the transmit power further based at least in part on the first control level or the second control level in response to transitioning from operating with at least the one or more first radios associated with the first RF exposure control scheme to operating with at least the one or more second radios associated with the second RF exposure control scheme.

In certain aspects, the wireless device may take into account additional RF exposure information associated with other RF exposure control schemes, for example, as described herein with respect to FIG. 7A. The wireless device may obtain additional RF exposure information associated with one or more third RF exposure control schemes. The wireless device may determine the transmit power based at least in part on the RF exposure information and the additional RF exposure information.

For certain aspects, an RF exposure control scheme may serve as a central controller for certain other RF exposure control scheme(s) and/or radio(s). The wireless device may determine updated RF exposure information for the one or more first radios based at least in part on the RF exposure information. The updated RF exposure information may include instruction(s), available exposure margin, and/or a maximum allowed transmit power for the one or more first radios, for example. The wireless device may provide the one or more first radios with the updated RF exposure information. The wireless device may transmit a second signal (assuming the signal at block 1004 is the first signal)

via the one or more first radios associated with the first RF exposure control scheme at a second transmit power (assuming the transmit power at block 1004 is the first transmit power) based at least in part on the updated RF exposure information. To determine the updated RF exposure information, the wireless device may determine the updated RF exposure information in accordance with the second RF exposure control scheme. For example, the second RF exposure control scheme may control the operation of the first RF exposure control scheme.

In certain aspects, if a central control RF exposure control scheme goes offline, another RF exposure control scheme may assume control. The wireless device may detect that the second RF exposure control scheme or the one or more second radios are offline (e.g., when an RF exposure control scheme is not operating). The wireless device may determine a third transmit power for the one or more first radios in accordance with the first RF exposure control scheme in response to detecting that the second RF exposure control scheme or the one or more second radios are offline. The wireless device may transmit a third signal via the one or more first radios at the third transmit power.

While the examples depicted in FIGS. 1-9 are described herein with respect to a UE performing the various methods for providing RF exposure compliance to facilitate understanding, aspects of the present disclosure may also be applied to other wireless communication devices (wireless devices), such as a base station and/or a CPE, performing the RF exposure compliance described herein. Further, while the examples are described with respect to communication between the UE (or other wireless device) and a network entity, the UE or other wireless device may be communicating with a device other than a network entity, for example another UE or with another device in a user's home that is not a network entity, for example.

Example Communications Device

Figure 11:
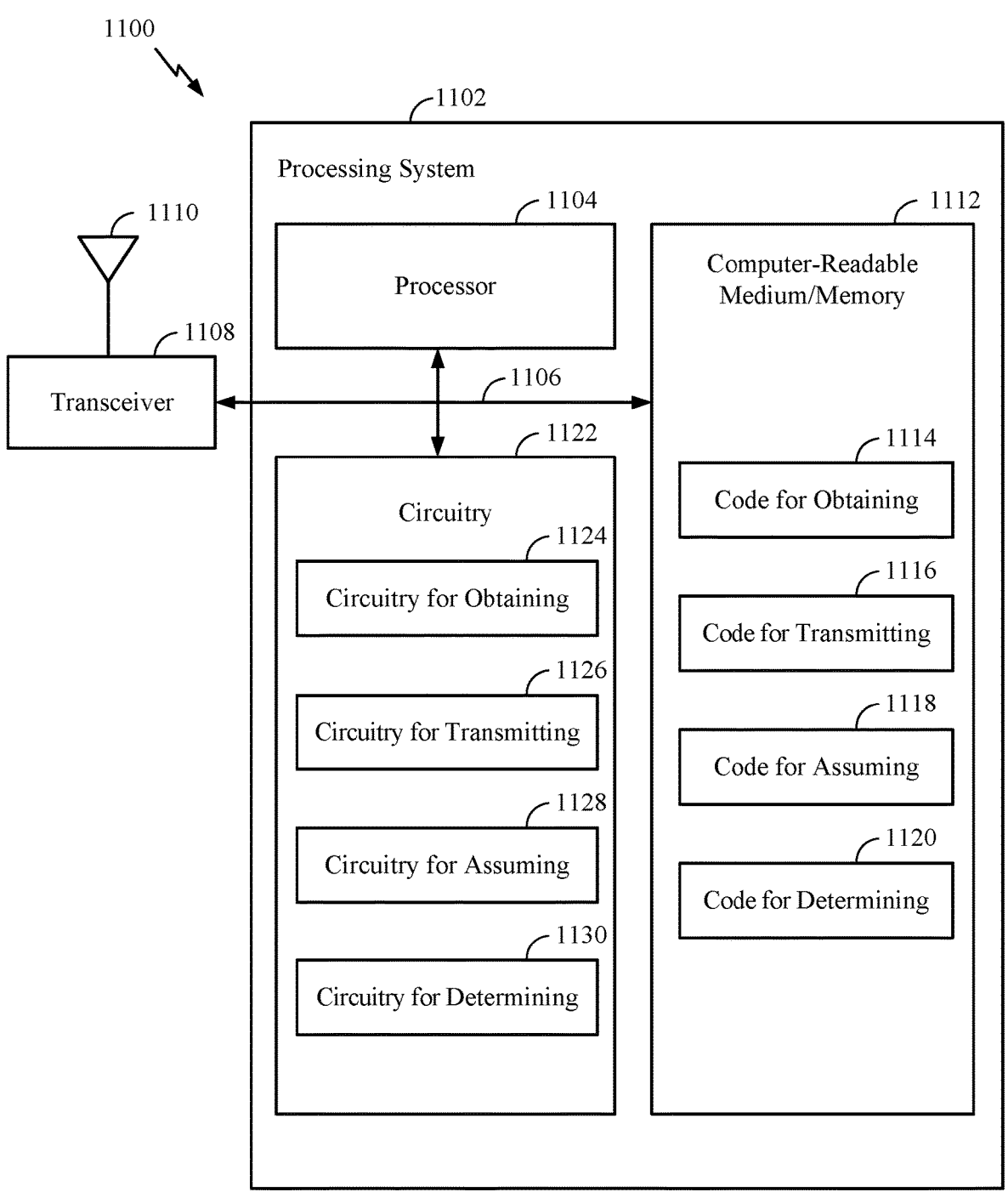
FIG. 11 illustrates a communications device (e.g., a UE) that may include various components configured to perform operations for the techniques disclosed herein, in accordance with certain aspects of the present disclosure.

FIG. 11 illustrates a communications device 1100 (e.g., the UE 120) that may include various components (e.g., corresponding to means-plus-function components) configured to perform operations for the techniques disclosed herein, such as the operations illustrated in FIG. 10. The communications device 1100 includes a processing system 1102, which may be coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 10, or other operations for performing the various techniques discussed herein for providing RF exposure compliance. In certain aspects, computer-readable medium/memory 1112 stores code for obtaining 1114, code for transmitting (or outputting for transmission or providing) 1116, code for assuming 1118, and/or code for determining 1120. In certain aspects, the processing system 1102 has circuitry 1122 configured to implement the code stored in the computer-readable medium/memory 1112. In certain aspects, the circuitry 1122 is coupled to the processor 1104 and/or the computer-readable medium/memory 1112 via the bus 1106. For example, the circuitry 1122 includes circuitry for obtaining 1124, circuitry for transmitting (or outputting for transmission or providing) 1126, circuitry for assuming 1128, and/or circuitry for determining 1130.

Means for transmitting (or means for outputting for transmission) may include a transmitter and one or more antennas, such as the transceiver 254 and/or antenna(s) 252 of the UE 120*a* illustrated in FIG. 2 and/or circuitry for transmitting 1126 of the communications device 1100 in FIG. 11. Means for obtaining, means for assuming, and/or means for determining may include a processing system, which may include one or more processors, such as the receive processor 258, the transmit processor 264, the TX MIMO processor 266, and/or the controller/processor 280 of the UE 120*a* illustrated in FIG. 2, the processing system 1102 of the communications device 1100 in FIG. 11, and/or the circuitry for obtaining 1124, circuitry for assuming 1128, and/or circuitry for determining 1130.

Example Aspects

Implementation examples are described in the following numbered clauses:

Aspect 1: A method of wireless communication by a wireless device, comprising: obtaining radio frequency (RF) exposure information associated with a first RF exposure control scheme, wherein the first RF exposure control scheme is associated with one or more first radios; and transmitting a first signal via one or more second radios associated with a second RF exposure control scheme at a first transmit power based at least in part on the RF exposure information, wherein the one or more first radios are different than the one or more second radios.

Aspect 2: The method of Aspect 1, wherein the first RF exposure control scheme is associated with a different radio access technology than the second RF exposure control scheme.

Aspect 3: The method of Aspect 1 or 2, wherein the first RF exposure control scheme applies a different mode of RF exposure compliance than the second RF exposure control scheme.

Aspect 4: The method according to any of Aspects 1-3, wherein the RF exposure information includes on-off information of the one or more first radios associated with the first RF exposure control scheme.

Aspect 5: The method of Aspect 4, wherein the on-off information indicates: a first time corresponding to when the one or more first radios associated with the first RF exposure control scheme were operating, a second time corresponding to when the one or more first radios associated with the first RF exposure control scheme were not operating, or a combination thereof.

Aspect 6: The method of Aspect 4 or 5, further comprising: assuming, for a duration corresponding to when the one or more first radios associated with the first RF exposure control scheme were operating derived from the on-off information, that the one or more first radios were operating at a particular exposure level; and determining the first transmit power based at least in part on the particular exposure level.

Aspect 7: The method of Aspect 6, wherein the particular exposure level is a maximum exposure level that satisfies a time-averaged RF exposure limit for the duration.

Aspect 8: The method according to any of Aspects 1-7, further comprising: when the RF exposure information indicates the wireless device is transmitting in a standalone mode via the one or more second radios associated with the second RF exposure control scheme, determining the first transmit power to be in compliance with an exposure margin associated with the second RF exposure control scheme; when the RF exposure information indicates the wireless device transitioned from transmitting via the one or more first radios associated with the first RF exposure control scheme to transmitting via the one or more second radios associated with the second RF exposure control scheme, determining the first transmit power to be in compliance with a first control level for a duration; when the RF exposure information indicates the wireless device transitioned from transmitting via the one or more first radios associated with the first RF exposure control scheme to transmitting via the one or more first radios associated with the first RF exposure control scheme and the one or more second radios associated with the second RF exposure control scheme, determining the first transmit power to be in compliance with a second control level for the duration, wherein the second control level is less than the first control level; and when the RF exposure information indicates the wireless device transitioned from transmitting via the one or more first radios associated with the first RF exposure control scheme and the one or more second radios associated with the second RF exposure control scheme to transmitting via the one or more second radios associated with the second RF exposure control scheme, determining the first transmit power to be in compliance with the first control level for the duration.

Aspect 9: The method of Aspect 8, wherein the duration is for at least one time window associated with the first RF exposure control scheme.

Aspect 10: The method according to any of Aspects 1-9, wherein the RF exposure information includes a time variation of RF exposure used by the first RF exposure control scheme over a past averaging time window.

Aspect 11: The method according to any of Aspects 1-10, wherein the RF exposure information includes an indication of an RF exposure margin used by the first RF exposure control scheme.

Aspect 12: The method according to any of Aspects 1-11, wherein the RF exposure information includes an indication of a first limit for transmitting via the one or more second radios associated with the second RF exposure control scheme.

Aspect 13: The method of Aspect 12, wherein the first limit is a remaining RF exposure margin determined as a difference of a value and an RF exposure margin used by the first RF exposure control scheme.

Aspect 14: The method of Aspect 12 or 13, further comprising: determining a smallest value among the first limit and a second RF exposure margin associated with the second RF exposure control scheme; and determining the first transmit power based at least in part on the smallest value.

Aspect 15: The method according to any of Aspects 1-14, further comprising: obtaining a first maximum time-averaged transmit power level, a second maximum time-averaged transmit power level, and a scaling factor, wherein the second maximum time-averaged transmit power level is less than the first maximum time-averaged transmit power level; and determining the first transmit power based at least in part on the RF exposure information, the first maximum time-averaged transmit power level, the second maximum time-averaged transmit power level, and the scaling factor.

Aspect 16: The method of Aspect 15, further comprising: determining a first control level as a product of the first maximum time-averaged transmit power level and the scaling factor; determining a second control level as a product of the second maximum time-averaged transmit power level and the scaling factor; and determining the first transmit power further based at least in part on the first control level or the second control level in response to transitioning from operating with at least the one or more first radios associated with the first RF exposure control scheme to operating with at least the one or more second radios associated with the second RF exposure control scheme.

Aspect 17: The method of Aspect 15 or 16, further comprising: obtaining a duration of a time window associated with the first RF exposure control scheme; and determining the first transmit power further based at least in part on the duration.

Aspect 18: The method according to any of Aspects 1-17, further comprising: obtaining additional RF exposure information associated with one or more third RF exposure control schemes; and determining the first transmit power based at least in part on the RF exposure information and the additional RF exposure information.

Aspect 19: The method according to any of Aspects 1-18, further comprising: determining updated RF exposure information for the one or more first radios based at least in part on the RF exposure information; providing the one or more first radios with the updated RF exposure information; and transmitting a second signal via the one or more first radios associated with the first RF exposure control scheme at a second transmit power based at least in part on the updated RF exposure information.

Aspect 20: The method of Aspect 19, wherein determining the updated RF exposure information comprises determining the updated RF exposure information in accordance with the second RF exposure control scheme.

Aspect 21: The method of Aspect 20, further comprising: detecting that the second RF exposure control scheme or the one or more second radios are offline; determining a third transmit power for the one or more first radios in accordance with the first RF exposure control scheme in response to detecting that the second RF exposure control scheme or the one or more second radios are offline; and transmitting a third signal via the one or more first radios at the third transmit power.

Aspect 22: An apparatus for wireless communication, comprising: a memory; and a processor coupled to the memory, the processor being configured to: obtain radio frequency (RF) exposure information associated with a first RF exposure control scheme, wherein the first RF exposure control scheme is associated with one or more first radios, and control transmission of a first signal via one or more second radios associated with a second RF exposure control scheme at a first transmit power based at least in part on the RF exposure information, wherein the one or more first radios are different than the one or more second radios.

Aspect 23: The apparatus of Aspect 22, wherein the first RF exposure control scheme is associated with a different radio access technology than the second RF exposure control scheme.

Aspect 24: The apparatus of Aspect 22 or 23, wherein the first RF exposure control scheme applies a different mode of RF exposure compliance than the second RF exposure control scheme.

Aspect 25: The apparatus according to any of Aspects 22-24, wherein the RF exposure information includes on-off information of the one or more first radios associated with the first RF exposure control scheme.

Aspect 26: The apparatus of Aspect 25, wherein the on-off information indicates: a first time corresponding to when the one or more first radios associated with the first RF exposure control scheme were operating, a second time corresponding to when the one or more first radios associated with the first RF exposure control scheme were not operating, or a combination thereof.

Aspect 27: The apparatus of Aspect 25 or 26, wherein the processor is further configured to: assume, for a duration corresponding to when the one or more first radios associated with the first RF exposure control scheme were operating derived from the on-off information, that the one or more first radios were operating at a particular exposure level; and determine the first transmit power based at least in part on the particular exposure level.

Aspect 28: The apparatus of Aspect 27, wherein the particular exposure level is a maximum exposure level that satisfies a time-averaged RF exposure limit for the duration.

Aspect 29: The apparatus according to any of Aspects 22-28, wherein the processor is further configured to: when the RF exposure information indicates the wireless device is transmitting in a standalone mode via the one or more second radios associated with the second RF exposure control scheme, determine the first transmit power to be in compliance with an exposure margin associated with the second RF exposure control scheme; when the RF exposure information indicates the wireless device transitioned from transmitting via the one or more first radios associated with the first RF exposure control scheme to transmitting via the one or more second radios associated with the second RF exposure control scheme, determine the first transmit power to be in compliance with a first control level for a duration; when the RF exposure information indicates the wireless device transitioned from transmitting via the one or more first radios associated with the first RF exposure control scheme to transmitting via the one or more first radios associated with the first RF exposure control scheme and the one or more second radios associated with the second RF exposure control scheme, determine the first transmit power to be in compliance with a second control level for the duration, wherein the second control level is less than the first control level; and when the RF exposure information indicates the wireless device transitioned from transmitting via the one or more first radios associated with the first RF exposure control scheme and the one or more second radios associated with the second RF exposure control scheme to transmitting via the one or more second radios associated with the second RF exposure control scheme, determine the first transmit power to be in compliance with the first control level for the duration.

Aspect 30: The apparatus of Aspect 29, wherein the duration is for at least one time window associated with the first RF exposure control scheme.

Aspect 31: The apparatus according to any of Aspects 22-30, wherein the RF exposure information includes a time variation of RF exposure used by the first RF exposure control scheme over a past averaging time window.

Aspect 32: The apparatus according to any of Aspects 22-31, wherein the RF exposure information includes an indication of an RF exposure margin used by the first RF exposure control scheme.

Aspect 33: The apparatus according to any of Aspects 22-32, wherein the RF exposure information includes an indication of a first limit for transmitting via the one or more second radios associated with the second RF exposure control scheme.

Aspect 34: The apparatus of Aspect 33, wherein the first limit is a remaining RF exposure margin determined as a difference of a value and an RF exposure margin used by the first RF exposure control scheme.

Aspect 35: The apparatus of Aspect 33 or 34, wherein the processor is further configured to: determine a smallest value among the first limit and a second RF exposure margin associated with the second RF exposure control scheme; and determine the first transmit power based at least in part on the smallest value.

Aspect 36: The apparatus according to any of Aspects 22-35, wherein the processor is further configured to: obtain a first maximum time-averaged transmit power level, a second maximum time-averaged transmit power level, and a scaling factor, wherein the second maximum time-averaged transmit power level is less than the first maximum time-averaged transmit power level; and determine the first transmit power based at least in part on the RF exposure information, the first maximum time-averaged transmit power level, the second maximum time-averaged transmit power level, and the scaling factor.

Aspect 37: The apparatus of Aspect 36, wherein the processor is further configured to: determine a first control level as a product of the first maximum time-averaged transmit power level and the scaling factor; determine a second control level as a product of the second maximum time-averaged transmit power level and the scaling factor; and determine the first transmit power further based at least in part on the first control level or the second control level in response to transitioning from operating with at least the one or more first radios associated with the first RF exposure control scheme to operating with at least the one or more second radios associated with the second RF exposure control scheme.

Aspect 38: The apparatus of Aspect 36 or 37, wherein the processor is further configured to: obtain a duration of a time window associated with the first RF exposure control scheme; and determine the first transmit power further based at least in part on the duration.

Aspect 39: The apparatus according to any of Aspects 22-38, wherein the processor is further configured to: obtain additional RF exposure information associated with one or more third RF exposure control schemes; and determine the first transmit power based at least in part on the RF exposure information and the additional RF exposure information.

Aspect 40: The apparatus according to any of Aspects 22-39, wherein the processor is further configured to: determine updated RF exposure information for the one or more first radios based at least in part on the RF exposure information; provide the one or more first radios with the updated RF exposure information; and control transmission of a second signal via the one or more first radios associated with the first RF exposure control scheme at a second transmit power based at least in part on the updated RF exposure information.

Aspect 41: The apparatus of Aspect 40, wherein to determine the updated RF exposure information, the processor is further configured to determine the updated RF exposure information in accordance with the second RF exposure control scheme.

Aspect 42: The apparatus of Aspect 41, wherein the processor is further configured to: detect that the second RF exposure control scheme or the one or more second radios are offline; determine a third transmit power for the one or more first radios in accordance with the first RF exposure control scheme in response to detecting that the second RF exposure control scheme or the one or more second radios are offline; and control transmission of a third signal via the one or more first radios at the third transmit power.

Aspect 43: The apparatus according to any of Aspects 22-42, further comprising a transmitter configured to transmit the first signal via the one or more second radios at the first transmit power.

Aspect 44: An apparatus, comprising: a memory comprising computer-executable instructions; and one or more processors configured to execute the computer-executable instructions and cause the apparatus to perform a method in accordance with any of Aspects 1-21.

Aspect 45: An apparatus, comprising means for performing a method in accordance with any of Aspects 1-21.

Aspect 46: A non-transitory computer-readable medium comprising computer-executable instructions that, when executed by one or more processors of a processing system, cause the processing system to perform a method in accordance with any of Aspects 1-21.

Aspect 47: A computer program product embodied on a computer-readable storage medium comprising code for performing a method in accordance with any of Aspects 1-21.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, the method comprising:

obtaining radio frequency (RF) exposure information associated with a first RF exposure control scheme, wherein the RF exposure information associated with the RF exposure control scheme includes a length of a time-averaging window for the first RF exposure control scheme, and wherein the first RF exposure control scheme is associated with one or more first radios;

transitioning to transmitting a first signal via one or more second radios associated with a second RF exposure control scheme;

during a duration corresponding to the length of the time-averaging window for the first RF exposure control scheme, transmitting the first signal via the one or more second radios associated with the second RF exposure control scheme at a reduced RF exposure level based at least in part on the RF exposure information, wherein the one or more first radios are different than the one or more second radios; and after the duration corresponding to the length of the time-averaging window for the first RF exposure control scheme, transmitting via the one or more second radios at an RF exposure level according to the second RF exposure scheme.

2. The method of claim 1, wherein the first RF exposure control scheme is associated with a different radio access technology than the second RF exposure control scheme.

3. The method of claim 1, wherein the first RF exposure control scheme applies a different mode of RF exposure compliance than the second RF exposure control scheme.

4. The method of claim 1, wherein the RF exposure information includes on-off information of the one or more first radios associated with the first RF exposure control scheme.

5. The method of claim 4, wherein the on-off information indicates:

a first time corresponding to when the one or more first radios associated with the first RF exposure control scheme were operating, a second time corresponding to when the one or more first radios associated with the first RF exposure control scheme were not operating, or a combination thereof.

6. The method of claim 4, further comprising:

determining, based on the on-off information of the one or more first radios associated with the first RF exposure control scheme, a duration that the one or more first radios associated with the first RF exposure control scheme were operating;

assuming an exposure level at which the one or more first radios were operating during the determined duration that the one or more first radios associated with the first RF exposure control scheme were operating; and determining the reduced RF exposure level based at least in part on the assumed exposure level.

7. The method of claim 6, wherein the exposure level is a maximum exposure level that satisfies a time-averaged RF exposure limit for the determined duration that the one or more first radios associated with the first RF exposure control scheme were operating.

8. The method of claim 1, further comprising:

when the RF exposure information indicates the wireless device is transmitting in a standalone mode via the one or more second radios associated with the second RF exposure control scheme, determining the reduced RF exposure level to be in compliance with an exposure margin associated with the second RF exposure control scheme;

when the RF exposure information indicates the wireless device transitioned from transmitting via the one or more first radios associated with the first RF exposure control scheme to transmitting via the one or more second radios associated with the second RF exposure control scheme, determining the reduced RF exposure level to be in compliance with a first control level;

when the RF exposure information indicates the wireless device transitioned from transmitting via the one or more first radios associated with the first RF exposure control scheme to transmitting via the one or more first radios associated with the first RF exposure control scheme and the one or more second radios associated with the second RF exposure control scheme, determining the reduced RF exposure level to be in compliance with a second control level, wherein the second control level is less than the first control level; and when the RF exposure information indicates the wireless device transitioned from transmitting via the one or more first radios associated with the first RF exposure control scheme and the one or more second radios associated with the second RF exposure control scheme to transmitting via the one or more second radios associated with the second RF exposure control scheme, determining the reduced RF exposure level to be in compliance with the first control level.

9. The method of claim 1, wherein the RF exposure information includes a time variation of RF exposure used by the first RF exposure control scheme over a past time-averaging time window.

10. The method of claim 1, wherein the RF exposure information includes an indication of an RF exposure margin used by the first RF exposure control scheme.

11. The method of claim 1, wherein the RF exposure information includes an indication of a first limit for transmitting via the one or more second radios associated with the second RF exposure control scheme.

12. The method of claim 11, wherein the first limit is a remaining RF exposure margin determined as a difference of a value and an RF exposure margin used by the first RF exposure control scheme.

13. The method of claim 11, further comprising:

determining a smallest value among the first limit and a second RF exposure margin associated with the second RF exposure control scheme; and determining the reduced RF exposure level based at least in part on the smallest value.

14. The method of claim 1, further comprising:

obtaining a first maximum time-averaged transmit power level, a second maximum time-averaged transmit power level, and a scaling factor, wherein the second maximum time-averaged transmit power level is less than the first maximum time-averaged transmit power level; and determining the reduced RF exposure level based at least in part on the RF exposure information, the first maximum time-averaged transmit power level, the second maximum time-averaged transmit power level, and the scaling factor.

15. The method of claim 14, further comprising:

determining a first control level as a product of the first maximum time-averaged transmit power level and the scaling factor;

determining a second control level as a product of the second maximum time-averaged transmit power level and the scaling factor; and determining the reduced RF exposure level further based at least in part on the first control level or the second control level in response to transitioning from operating with at least the one or more first radios associated with the first RF exposure control scheme to operating with at least the one or more second radios associated with the second RF exposure control scheme.

16. The method of claim 1, further comprising:

obtaining additional RF exposure information associated with one or more third RF exposure control schemes; and determining the reduced RF exposure level based at least in part on the RF exposure information and the additional RF exposure information.

17. The method of claim 1, further comprising:

determining updated RF exposure information for the one or more first radios based at least in part on the RF exposure information;

providing the one or more first radios with the updated RF exposure information; and transmitting a second signal via the one or more first radios associated with the first RF exposure control scheme at a second transmit power based at least in part on the updated RF exposure information.

18. The method of claim 17, wherein determining the updated RF exposure information comprises determining the updated RF exposure information in accordance with the second RF exposure control scheme.

19. The method of claim 18, further comprising:

detecting that the second RF exposure control scheme or the one or more second radios are offline;

determining a third transmit power for the one or more first radios in accordance with the first RF exposure control scheme in response to detecting that the second RF exposure control scheme or the one or more second radios are offline; and transmitting a third signal via the one or more first radios at the third transmit power.

20. An apparatus for wireless communication, the apparatus comprising:

memory storing computer-executable code; and one or more processors coupled to the memory, the one or more processors being configured to, individually or collectively, execute the computer-executable code and cause the apparatus to:

obtain radio frequency (RF) exposure information associated with a first RF exposure control scheme, wherein the RF exposure information associated with the RF exposure control scheme includes a length of a time-averaging window for the first RF exposure control scheme, and wherein the first RF exposure control scheme is associated with one or more first radios;

transition to transmitting a first signal via one or more second radios associated with a second RF exposure control scheme;

during a duration corresponding to the length of the time-averaging window for the first RF exposure control scheme, control transmission of the first signal via the one or more second radios associated with the second RF exposure control scheme at a reduced RF exposure level based at least in part on the RF exposure information, wherein the one or more first radios are different than the one or more second radios; and after the duration corresponding to the length of the time-averaging window for the first RF exposure control scheme, transmit via the one or more second radios at an RF exposure level according to the second RF exposure scheme.

21. The apparatus of claim 20, wherein the RF exposure information includes on-off information of the one or more first radios associated with the first RF exposure control scheme.

22. The apparatus of claim 20, wherein the RF exposure information includes an indication of an RF exposure margin used by the first RF exposure control scheme.

23. An apparatus for wireless communication, the apparatus comprising:

means for obtaining radio frequency (RF) exposure information associated with a first RF exposure control scheme, wherein the RF exposure information associated with the RF exposure control scheme includes a length of a time-averaging window for the first RF exposure control scheme, and wherein the first RF exposure control scheme is associated with one or more first radios;

means for transitioning to transmitting a first signal via one or more second radios associated with a second RF exposure control scheme;

means for, during a duration corresponding to the length of the time-averaging window for the first RF exposure control scheme, transmitting the first signal via the one or more second radios associated with the second RF exposure control scheme at a reduced RF exposure level based at least in part on the RF exposure information, wherein the one or more first radios are different than the one or more second radios; and means for, after the duration corresponding to the length of the time-averaging window for the first RF exposure control scheme, transmitting via the one or more second radios at an RF exposure level according to the second RF exposure scheme.

* * * * *